United States Patent
Park et al.

(10) Patent No.: US 9,584,742 B2
(45) Date of Patent: Feb. 28, 2017

(54) METHOD OF BINNING PIXELS IN AN IMAGE SENSOR AND AN IMAGE SENSOR FOR PERFORMING THE SAME

(71) Applicant: SAMSUNG ELECTRONICS CO., LTD., Suwon-si, Gyeonggi-do (KR)

(72) Inventors: Byung-Chul Park, Yongin-si (KR); Won-Baek Lee, Suwon-si (KR); Byung-Jo Kim, Seoul (KR); Jin-Ho Seo, Seoul (KR); Seog-Heon Ham, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 86 days.

(21) Appl. No.: 14/540,450

(22) Filed: Nov. 13, 2014

(65) Prior Publication Data
US 2015/0189198 A1 Jul. 2, 2015

(30) Foreign Application Priority Data
Jan. 2, 2014 (KR) ........................ 10-2014-0000431

(51) Int. Cl.
*H04N 5/347* (2011.01)
(52) U.S. Cl.
CPC .................... *H04N 5/347* (2013.01)
(58) Field of Classification Search
CPC ..................................................... H04N 5/347
USPC ........................................................ 348/302
See application file for complete search history.

(56) References Cited

U.S. PATENT DOCUMENTS

| | | | |
|---|---|---|---|
| 7,319,218 B2 | 1/2008 | Krymski | |
| 7,773,138 B2 | 8/2010 | Lahav et al. | |
| 7,929,807 B2 | 4/2011 | Andersen | |
| 8,306,362 B2 | 11/2012 | Compton | |
| 8,879,686 B2 * | 11/2014 | Okada | H04N 5/32 378/19 |
| 2008/0260291 A1 | 10/2008 | Alakarhu et al. | |
| 2010/0231765 A1 * | 9/2010 | Kefeder | H04N 9/045 348/273 |
| 2011/0101205 A1 * | 5/2011 | Tian | H04N 9/045 250/208.1 |
| 2012/0026368 A1 | 2/2012 | Cote et al. | |
| 2012/0194720 A1 | 8/2012 | Bowers | |
| 2013/0193334 A1 * | 8/2013 | Dowaki | H04N 5/32 250/370.09 |
| 2015/0009385 A1 * | 1/2015 | Tsukida | H04N 5/374 348/308 |
| 2016/0080713 A1 * | 3/2016 | Tanaka | H04N 9/045 348/242 |
| 2016/0286108 A1 * | 9/2016 | Fettig | H04N 5/235 |

FOREIGN PATENT DOCUMENTS

| | | | | |
|---|---|---|---|---|
| CN | WO 2014022965 A1 * | 2/2014 | .......... | G06T 3/4015 |
| NL | WO 2011023229 A1 * | 3/2011 | ............ | H04N 5/347 |

\* cited by examiner

*Primary Examiner* — Roberto Velez
*Assistant Examiner* — Cynthia Segura
(74) *Attorney, Agent, or Firm* — F. Chau & Associates, LLC

(57) ABSTRACT

A method of binning pixels in an image sensor including: dividing a pixel array into a plurality of binning areas, wherein each binning area includes (2n)*(2n) pixels, wherein n is an integer equal to or greater than two; and generating binning pixel data in each of the binning areas, wherein the locations of the binning pixel data of each binning area are evenly distributed within the binning area.

15 Claims, 18 Drawing Sheets

METHOD OF BINNING PIXELS IN AN IMAGE SENSOR AND AN IMAGE SENSOR FOR PERFORMING THE SAME

CROSS-REFERENCE TO RELATED APPLICATION(S)

This application claims priority under 35 U.S.C. §119 to Korean Patent Application No. 10-2014-0000431, filed on Jan. 2, 2014 in the Korean Intellectual Property Office (KIPO), the disclosure of which is incorporated by reference herein in its entirety.

TECHNICAL FIELD

The present inventive concept relates to an image sensor, and more particularly to a method of binning pixels in an image sensor and an image sensor for performing the method.

DESCRIPTION OF THE RELATED ART

Image data generated by an image sensor may increase as the number of pixels included in the image sensor increases.

If the image data is too large, a high frame rate in a video mode may not be maintained and power consumption may increase.

Therefore, a pixel binning technique, which generates one binning pixel data using pixel data of adjacent pixels, may be used to reduce the size of the image data.

However, when the pixel binning is used, the quality of the image data may be degraded due to noise.

SUMMARY

An exemplary embodiment of the present inventive concept provides a method of binning pixels in an image sensor comprising: dividing a pixel array into a plurality of binning areas, wherein each binning area includes $(2n)*(2n)$ pixels, wherein n is an integer equal to or greater than two; and generating binning pixel data in each of the binning areas, wherein the locations of the binning pixel data of each binning area are evenly distributed within the binning area.

The locations of the binning pixel data of a binning area are spaced apart from each other.

The locations of the binning pixel data of a first row in a binning area are separated from each other by substantially the same distance as the locations of the binning pixel data of a second row in the binning area.

The locations of the binning pixel data of a first column in a binning area are separated from each other by substantially the same distance as the locations of the binning pixel data of a second column in the binning area.

The locations of the binning pixel data of a first row in a binning area are separated from a first edge of the binning area by a first distance and the locations of the binning pixel data of a second row in the binning area are separated from a second edge of the binning area by a second distance, wherein the first and second edges are opposite each other and the first and second distances are substantially the same.

The locations of the binning pixel data of a first column in a binning area are separated from a first edge of the binning area by a first distance and the locations of the binning pixel data of a second column in the binning area are separated from a second edge of the binning area by a second distance, wherein the first and second edges are opposite each other and the first and second distances are substantially the same.

The locations of the binning pixel data of a binning area are respectively disposed at an intersecting point of a plurality of pixels.

The locations of the binning pixel data of a binning area are not clustered.

An exemplary embodiment of the present inventive concept provides a method of binning pixels in an image sensor comprising: dividing a pixel array into a plurality of binning areas, wherein each binning area includes $(2n)*(2n)$ pixels, wherein n is an integer equal to or greater than two; for pixels having the same color in each of the binning areas, selecting a number of those pixels in a row and selecting a different number of those pixels in another row; and generating binning pixel data from the selected pixels.

In a first binning area of the binning areas the selected pixels having the same color include a first color, a first pixel disposed at a vertex of the first binning area in a first row and in a first column, a second pixel disposed apart from the first pixel in the first row, and a third pixel disposed apart from the first pixel in the first column.

The first color includes blue, red or green.

The first, second and third pixels form a right-angle triangle.

The second pixel is the farthest same color pixel from the first pixel in the first row.

The third pixel is the farthest same color pixel from the first pixel in the first column.

The selected pixels having the same first color in the first binning area include at least one pixel disposed between the first and second pixels in the first row, at least one pixel disposed between the first and third pixels in the first column or at least one pixel disposed along a straight line formed between the second and third pixels.

Generating the binning pixel data comprises performing an arithmetic average operation on the selected pixels having the same first color in the first binning area to generate first binning pixel data.

Generating the binning pixel data comprises performing a weighted average operation on the selected pixels having the same first color in the first binning area to generate first binning pixel data.

The pixel array has a Bayer pattern.

The binning pixel data is generated in a video recording mode.

An exemplary embodiment of the present inventive concept provides an image sensor comprising: a pixel array including a plurality of pixels, wherein each of the pixels generates an analog signal in response to incident light; a controller configured to select different numbers of pixels from a first row and a second row in a binning area of the pixel array, wherein the binning area includes $(2n)*(2n)$ pixels; an analog to digital converter configured to generate pixel data in response to the analog signals provided from each of the pixels and generate averaging pixel data in response to the analog signals provided from the selected pixels; and an image signal processor configured to receive an output of the analog to digital converter.

The analog to digital converter generates the pixel data in response to the analog signals provided from each of the pixels in a first operation mode and generates the averaging pixel data in response to the analog signals provided from the selected pixels in a second operation mode.

The analog to digital converter averages the selected pixels from the first row, and the image signal processor averages the average value of the selected pixels from the first row and the selected pixels from the second row.

The computing system further comprises a camera serial interface.

An exemplary embodiment of the present inventive concept provides a method of binning pixels in an image sensor comprising: dividing a pixel array into a plurality of binning areas, wherein a first binning area includes (2n)*(2n) pixels, wherein n is an integer equal to or greater than two; for first color pixels in the first binning area, selecting two of the first color pixels from a first row that are separated by the greatest distance from each other and selecting one first color pixel from a second row, wherein the selected one first color pixel from the second row is in the same column as one of the selected first color pixels from the first row; first averaging the selected two first color pixels from the first row; adding the average of the selected two first color pixels from the first row to a value of the selected one first color pixel from the second row; and second averaging this sum to produce binning pixel data for the three selected first color pixels.

The binning pixel data for the three selected first color pixels is produced in a sub-sampling mode.

The sub-sampling mode is an image preview mode or a movie mode.

The first averaging is performed in an analog to digital converter and the second averaging is performed in an image signal processor.

An exemplary embodiment of the present inventive concept provides an image sensor comprising: a pixel array including a plurality of pixels, wherein each of the pixels generates an analog signal in response to incident light; a controller configured to select pixels from a first row and a second row in a binning area of the pixel array, wherein the binning area includes (2n)*(2n) pixels; an analog to digital converter configured to generate pixel data in response to the analog signals provided from each of the pixels and generate averaging pixel data in response to the analog signals provided from the selected pixels; and an image signal processor configured to receive an output of the analog to digital converter, wherein, in a sub-sampling mode, the analog to digital converter: performs a count operation on a first pixel and a second pixel, which have a same color and correspond to selected pixels of the first row, to generate a first count value and a second count value, respectively, performs the count operation on a third pixel, which has the same color as the first pixel, corresponds to a selected pixel of the second row, and is arranged in a same column as the first pixel, after the generation of the first count value to generate a third count value, and stops performing the count operation on a fourth pixel, which corresponds to an unselected pixel of the second row, and is arranged in a same column as the second pixel.

The analog to digital converter averages the third count value and the second count value to generate the averaging pixel data.

The image sensor further comprises a camera serial interface.

BRIEF DESCRIPTION OF THE DRAWINGS

The above and other features of the present inventive concept will become more apparent by describing in detail exemplary embodiments thereof, with reference to the accompanying drawings.

DETAILED DESCRIPTION OF THE EMBODIMENTS

Figure 1:
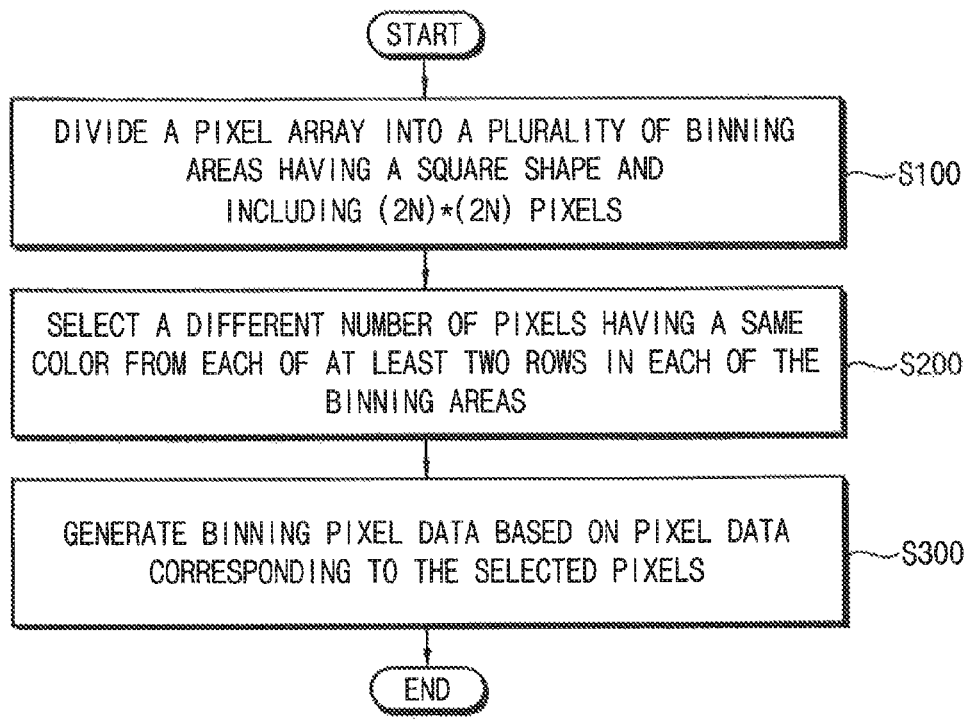
FIG. 1 is a flow chart illustrating a method of binning pixels in an image sensor according to an exemplary embodiment of the present inventive concept.

Hereinafter, exemplary embodiments of the present inventive concept will be described in detail with reference to the accompanying drawings. The present inventive concept may, however, be embodied in many different forms and should not be construed as limited to the embodiments set forth herein. Like reference numerals may refer to like elements throughout this application.

It will be understood that when an element is referred to as being "connected" or "coupled" to another element, it can be directly connected or coupled to the other element or intervening elements may be present.

As used herein, the singular forms "a," "an" and "the" are intended to include the plural forms as well, unless the context clearly indicates otherwise.

FIG. 1 is a flow chart illustrating a method of binning pixels in an image sensor according to an exemplary embodiment of the present inventive concept.

The image sensor for performing the method of binning pixels of FIG. 1 includes a pixel array having a plurality of pixels arranged in rows and columns.

Figure 2:
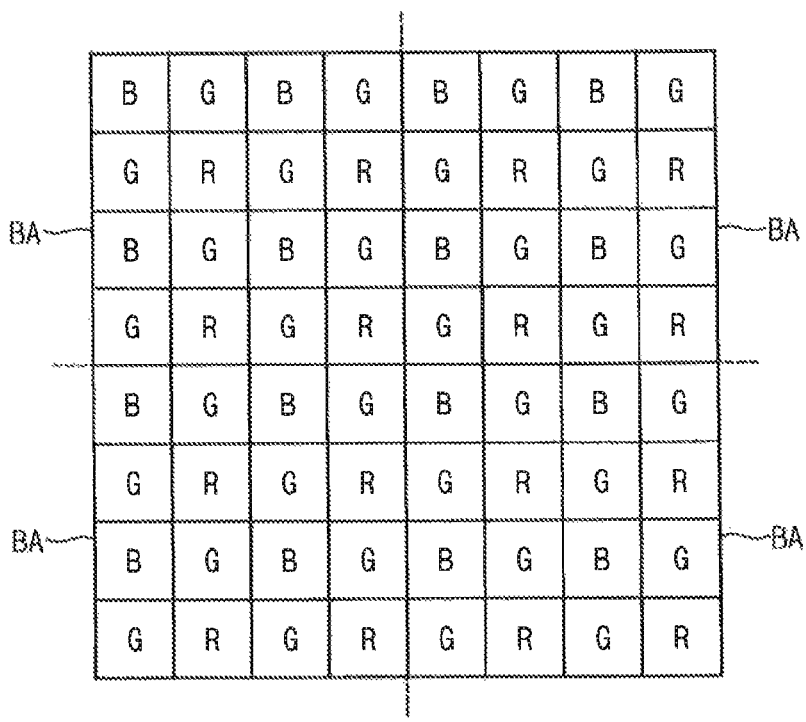
FIG. 2 is a diagram illustrating a part of a pixel array included in an image sensor for performing the method of binning pixels of FIG. 1, according to an exemplary embodiment of the present inventive concept.

FIG. 2 is a diagram illustrating a part of a pixel array included in an image sensor for performing the method of binning pixels of FIG. 1, according to an exemplary embodiment of the present inventive concept.

Referring to FIG. 2, the pixel array PA has a Bayer pattern. For example, the pixel array PA may include an odd row in which blue pixels B and green pixels G are alternately arranged and an even row in which green pixels G and red pixels R are alternately arranged.

Referring to FIGS. 1 and 2, in the method of binning pixels according to an exemplary embodiment of the present inventive concept, the pixel array PA is divided into a plurality of binning areas BA having a square shape such that each of the binning areas BA includes (2n)*(2n) pixels (step S100). Here, n represents an integer equal to or greater than two.

In FIG. 2, n is two as an example such that each of the binning areas BA includes 4*4 pixels. However, exemplary embodiments of the present inventive concept are not limited thereto, and n may be any integer equal to or greater than two.

A different number of pixels having a same color are selected from each of at least two rows in each of the binning areas BA (step S200). Therefore, in each of the binning areas BA, the number of the pixels selected from each of the at least two rows may be different from each other.

For example, in each of the binning areas BA, at least two rows may be selected for the blue pixels B and a different number of the blue pixels B may be selected from each of the at least two rows, at least two rows may be selected for the green pixels G and a different number of the green pixels G may be selected from each of the at least two rows, and at least two rows may be selected for the red pixels R and a different number of the red pixels R may be selected from each of the at least two rows.

In an exemplary embodiment of the present inventive concept, when selecting a different number of pixels having a same color from each of at least two rows in each of the binning areas BA (step S200), two rows may be selected for each of the blue pixels B, the green pixels G and the red pixels R in each of the binning areas BA, a first pixel and a second pixel having a same color as each other may be selected from one of the selected two rows, and a third pixel having the same color as the first pixel and the second pixel may be selected from the other one of the selected two rows.

Since the number of the green pixels G is twice of the number of the blue pixels B and the number of the red pixels R in the Bayer pattern, one set of the first through third pixels may be selected for the blue pixels B in each of the binning areas BA, one set of the first through third pixels may be selected for the red pixels R in each of the binning areas BA, and two sets of the first through third pixels may be selected for the green pixels G in each of the binning areas BA.

In an exemplary embodiment of the present inventive concept, the first pixel may be located at a vertex of the binning area BA, and the third pixel and the first pixel may be located in a same column.

Since the second pixel and the first pixel are located in a same row, a selection area formed by connecting the first through third pixels with each other may have a right-angled triangle shape.

In an exemplary embodiment of the present inventive concept, the second pixel may correspond to a pixel that has a same color as the first pixel and is farthest from the first pixel in a row direction in the binning area BA, and the third pixel may correspond to a pixel that has a same color as the first pixel and is farthest from the first pixel in a column direction in the binning area BA.

In this case, the selection area formed by connecting the first through third pixels with each other may have a right-angled isosceles triangle shape.

Figure 3:
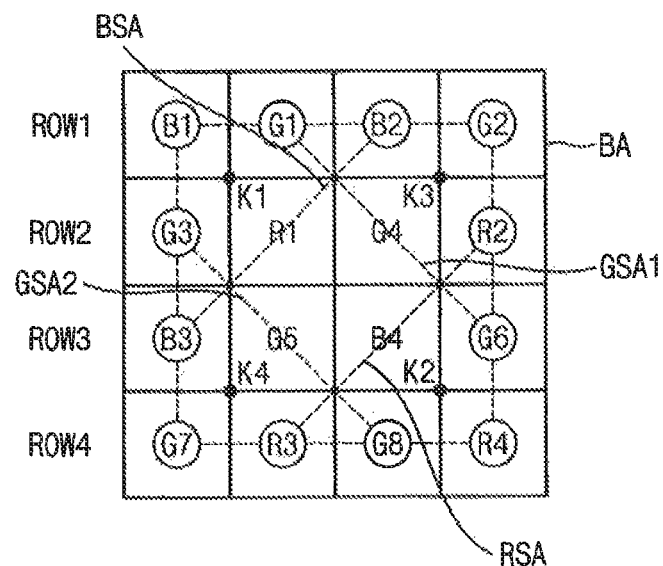
FIGS. 3, 4 and 5 are diagrams for describing selecting a different number of pixels having a same color from each of at least two rows in each binning area of FIG. 1, according to an exemplary embodiment of the present inventive concept.
Figure 4:
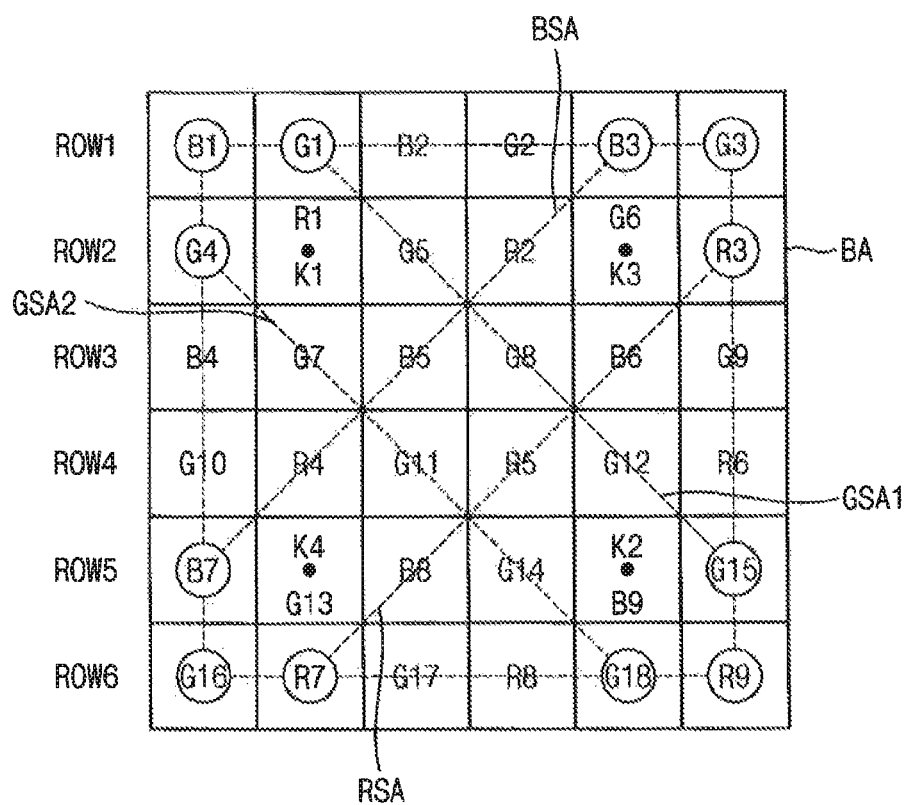
Figure 5:
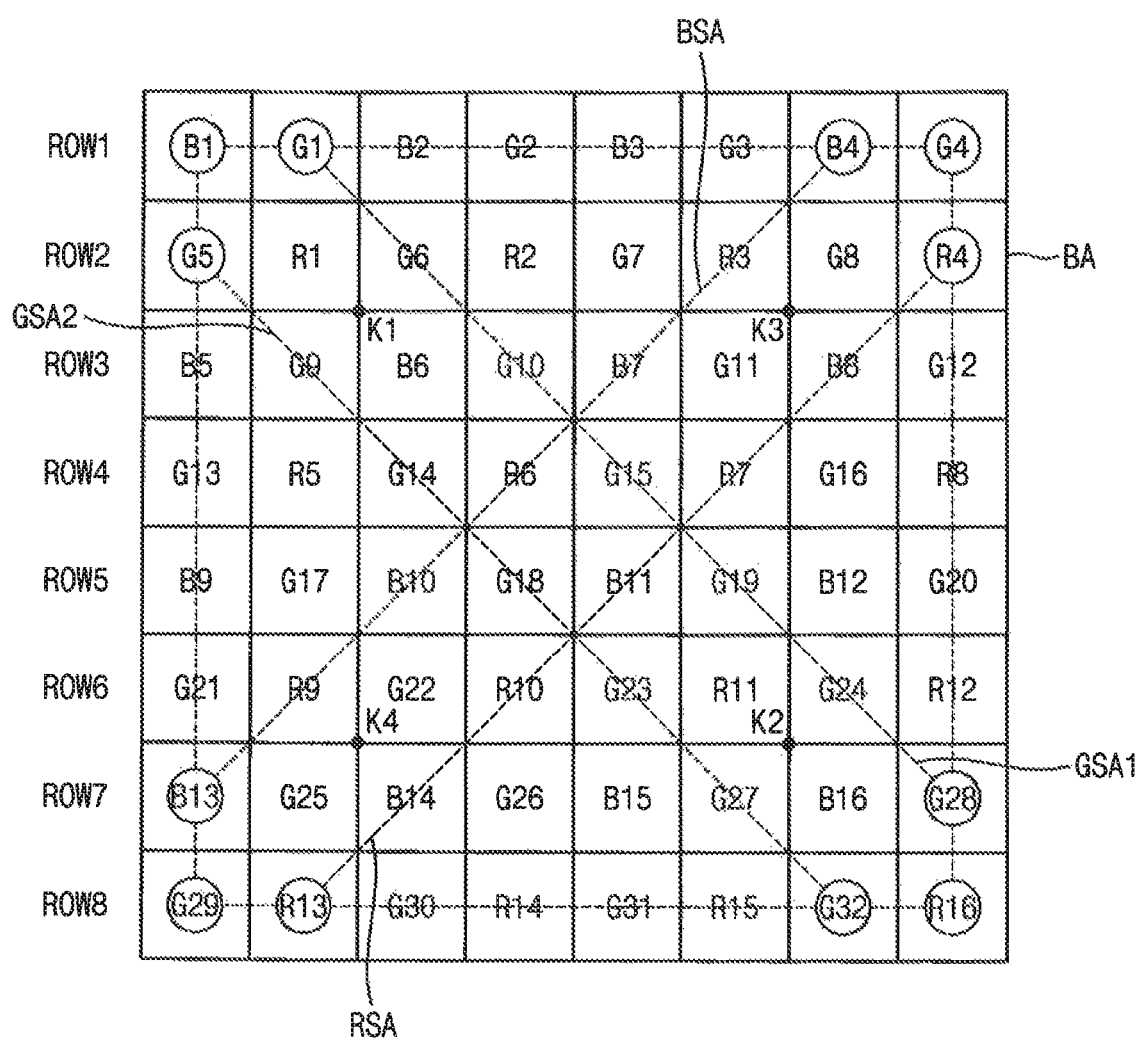

FIGS. 3, 4 and 5 are diagrams for describing selecting a different number of pixels having a same color from each of at least two rows in each of the binning areas of FIG. 1, according to an exemplary embodiment of the present inventive concept.

In FIG. 3, n is two such that each of the binning areas BA includes 4*4 pixels. In FIG. 4, n is three such that each of the binning areas BA includes 6*6 pixels. In FIG. 5, n is four such that each of the binning areas BA includes 8*8 pixels.

In FIGS. 3, 4 and 5, pixels having a circle mark represent the selected pixels.

In FIG. 3, the binning area BA includes first through fourth rows ROW1, ROW2, ROW3 and ROW4.

Referring to FIG. 3, the first row ROW1 and the third ROW3 may be selected for the blue pixels B, a first blue pixel B1 and a second blue pixel B2 may be selected from the first row ROW1, and a third blue pixel B3 may be selected from the third row ROW3. As such, one set of the first through third blue pixels B1, B2 and B3 may be selected in the binning areas BA.

The first blue pixel B1 may be located at a vertex of the binning area BA, the second blue pixel B2 may correspond to a blue pixel that is farthest from the first blue pixel B1 in a row direction in the binning area BA, and the third blue pixel B3 may correspond to a blue pixel that is farthest from the first blue pixel B1 in a column direction in the binning area BA.

The fourth row ROW4 and the second ROW2 may be selected for the red pixels R, a first red pixel R4 and a second red pixel R3 may be selected from the fourth row ROW4, and a third red pixel R2 may be selected from the second row ROW2. As such, one set of the first through third red pixels R4, R3 and R2 may be selected in the binning areas BA.

The first red pixel R4 may be located at a vertex of the binning area BA, the second red pixel R3 may correspond to a red pixel that is farthest from the first red pixel R4 in a row direction in the binning area BA, and the third red pixel R2 may correspond to a red pixel that is farthest from the first red pixel R4 in a column direction in the binning area BA.

The first row ROW1 and the third ROW3 may be selected for the green pixels G, a first green pixel G2 and a second green pixel G1 may be selected from the first row ROW1, and a third green pixel G6 may be selected from the third row ROW3. As such, a first set of the first through third green pixels G2, G1 and G6 may be selected in the binning areas BA.

The first green pixel G2 may be located at a vertex of the binning area BA, the second green pixel G1 may correspond to a green pixel that is farthest from the first green pixel G2 in a row direction in the binning area BA, and the third green pixel G6 may correspond to a green pixel that is farthest from the first green pixel G2 in a column direction in the binning area BA.

The fourth row ROW4 and the second ROW2 may be selected for the green pixels q a first green pixel G7 and a second green pixel G8 may be selected from the fourth row ROW4, and a third green pixel G3 may be selected from the second row ROW2. As such, a second set of the first through third green pixels G7, G8 and G3 may be selected in the binning areas BA.

The first green pixel G7 may be located at a vertex of the binning area BA, the second green pixel G8 may correspond to a green pixel that is farthest from the first green pixel G7 in a row direction in the binning area BA, and the third green pixel G3 may correspond to a green pixel that is farthest from the first green pixel G7 in a column direction in the binning area BA.

As illustrated in FIG. 3, a blue selection area BSA, which is formed by connecting the first through third blue pixels B1, B2 and B3 with each other, a red selection area RSA, which is formed by connecting the first through third red pixels R4, R3 and R2 with each other, a first green selection area GSA1, which is formed by connecting the first set of the first through third green pixels G2, G1 and G6 with each other, and a second green selection area GSA2, which is formed by connecting the second set of the first through third green pixels G7, G8 and G3 with each other, may have a right-angled isosceles triangle shape.

In an exemplary embodiment of the present inventive concept, the blue selection area BSA, the red selection area RSA, the first green selection area GSA1 and the second green selection area GSA2 may be symmetrically arranged in the binning area BA.

In an exemplary embodiment of the present inventive concept, the blue selection area BSA, the red selection area RSA, the first green selection area GSA1 and the second green selection area GSA2 may overlap each other in the binning area BA.

In FIG. 4, the binning area BA includes first through sixth rows ROW1, ROW2, ROW3, ROW4, ROW5 and ROW6.

Referring to FIG. 4, the first row ROW1 and the fifth ROW5 may be selected for the blue pixels B, a first blue pixel B1 and a second blue pixel B3 may be selected from the first row ROW1, and a third blue pixel B7 may be selected from the fifth row ROW5. As such, one set of the first through third blue pixels B1, B3 and B7 may be selected in the binning areas BA.

The first blue pixel B1 may be located at a vertex of the binning area BA, the second blue pixel B3 may correspond to a blue pixel that is farthest from the first blue pixel B1 in a row direction in the binning area BA, and the third blue pixel B7 may correspond to a blue pixel that is farthest from the first blue pixel B1 in a column direction in the binning area BA.

The sixth row ROW6 and the second ROW2 may be selected for the red pixels R, a first red pixel R9 and a second red pixel R7 may be selected from the sixth row ROW6, and a third red pixel R3 may be selected from the second row ROW2. As such, one set of the first through third red pixels R9, R7 and R3 may be selected in the binning areas BA.

The first red pixel R9 may be located at a vertex of the binning area BA, the second red pixel R7 may correspond to a red pixel that is farthest from the first red pixel R9 in a row direction in the binning area BA, and the third red pixel R3 may correspond to a red pixel that is farthest from the first red pixel R9 in a column direction in the binning area BA.

The first row ROW1 and the fifth ROW5 may be selected for the green pixels GA a first green pixel G3 and a second green pixel G1 may be selected from the first row ROW1, and a third green pixel G15 may be selected from the fifth row ROW5. As such, a first set of the first through third green pixels G3, G1 and G15 may be selected in the binning areas BA.

The first green pixel G3 may be located at a vertex of the binning area BA, the second green pixel G1 may correspond to a green pixel that is farthest from the first green pixel G3 in a row direction in the binning area BA, and the third green pixel G15 may correspond to a green pixel that is farthest from the first green pixel G3 in a column direction in the binning area BA.

The sixth row ROW6 and the second ROW2 may be selected for the green pixels G, a first green pixel G16 and a second green pixel G18 may be selected from the sixth row ROW6, and a third green pixel G4 may be selected from the second row ROW2. As such, a second set of the first through third green pixels G16, G18 and G4 may be selected in the binning areas BA.

The first green pixel G16 may be located at a vertex of the binning area BA, the second green pixel G18 may correspond to a green pixel that is farthest from the first green pixel G16 in a row direction in the binning area BA, and the third green pixel G4 may correspond to a green pixel that is farthest from the first green pixel G16 in a column direction in the binning area BA.

As illustrated in FIG. 4, a blue selection area BSA, which is formed by connecting the first through third blue pixels B1, B3 and B7 with each other, a red selection area RSA, which is formed by connecting the first through third red pixels R9, R7 and R3 with each other, a first green selection area GSA1, which is formed by connecting the first set of the first through third green pixels G3, G1 and G15 with each other, and a second green selection area GSA2, which is formed by connecting the second set of the first through third green pixels G16, G18 and G4 with each other, may have a right-angled isosceles triangle shape.

In an exemplary embodiment of the present inventive concept, the blue selection area BSA, the red selection area RSA, the first green selection area GSA1 and the second green selection area GSA2 may be symmetrically arranged in the binning area BA.

In an exemplary embodiment of the present inventive concept, the blue selection area BSA, the red selection area RSA, the first green selection area GSA1 and the second green selection area GSA2 may overlap each other in the binning area BA.

In FIG. 5, the binning area BA includes first through eighth rows ROW1, ROW2, ROW3, ROW4, ROW5, ROW6, ROW7 and ROW8.

Referring to FIG. 5, the first row ROW1 and the seventh ROW7 may be selected for the blue pixels B, a first blue pixel B1 and a second blue pixel B4 may be selected from the first row ROW1, and a third blue pixel B13 may be selected from the seventh row ROW7. As such, one set of the first through third blue pixels B1, B4 and B13 may be selected in the binning areas BA.

The first blue pixel B1 may be located at a vertex of the binning area BA, the second blue pixel B4 may correspond to a blue pixel that is farthest from the first blue pixel B1 in a row direction in the binning area BA, and the third blue pixel B13 may correspond to a blue pixel that is farthest from the first blue pixel B1 in a column direction in the binning area BA.

The eighth row ROW8 and the second ROW2 may be selected for the red pixels R, a first red pixel R16 and a second red pixel R13 may be selected from the eighth row ROW8, and a third red pixel R4 may be selected from the second row ROW2. As such, one set of the first through third red pixels R16, R13 and R4 may be selected in the binning areas BA.

The first red pixel R16 may be located at a vertex of the binning area BA, the second red pixel R13 may correspond to a red pixel that is farthest from the first red pixel R16 in a row direction in the binning area BA, and the third red pixel R4 may correspond to a red pixel that is farthest from the first red pixel R16 in a column direction in the binning area BA.

The first row ROW1 and the seventh ROW7 may be selected for the green pixels Q a first green pixel G4 and a second green pixel G1 may be selected from the first row ROW1, and a third green pixel G28 may be selected from the seventh row ROW7. As such, a first set of the first through third green pixels G4, G1 and G28 may be selected in the binning areas BA.

The first green pixel G4 may be located at a vertex of the binning area BA, the second green pixel G1 may correspond to a green pixel that is farthest from the first green pixel G4 in a row direction in the binning area BA, and the third green pixel G28 may correspond to a green pixel that is farthest from the first green pixel G4 in a column direction in the binning area BA.

The eighth row ROW8 and the second ROW2 may be selected for the green pixels G a first green pixel G29 and a second green pixel G32 may be selected from the eighth row ROW8, and a third green pixel G5 may be selected from the second row ROW2. As such, a second set of the first through third green pixels G29, G32 and G5 may be selected in the binning areas BA.

The first green pixel G29 may be located at a vertex of the binning area BA, the second green pixel G32 may correspond to a green pixel that is farthest from the first green pixel G29 in a row direction in the binning area BA, and the third green pixel G5 may correspond to a green pixel that is farthest from the first green pixel G29 in a column direction in the binning area BA.

As illustrated in FIG. 5, a blue selection area BSA, which is formed by connecting the first through third blue pixels B1, B4 and B13 with each other, a red selection area RSA, which is formed by connecting the first through third red pixels R16, R13 and R4 with each other, a first green selection area GSA1, which is formed by connecting the first set of the first through third green pixels G4, G1 and G28 with each other, and a second green selection area GSA2, which is formed by connecting the second set of the first through third green pixels G29, G32 and G5 with each other, may have a right-angled isosceles triangle shape.

In an exemplary embodiment of the present inventive concept, the blue selection area BSA, the red selection area RSA, the first green selection area GSA1 and the second green selection area GSA2 may be symmetrically arranged in the binning area BA.

In an exemplary embodiment of the present inventive concept, the blue selection area BSA, the red selection area RSA, the first green selection area GSA1 and the second green selection area GSA2 may overlap each other in the binning area BA.

Referring again to FIG. 1, binning pixel data is generated based on pixel data corresponding to the selected pixels (step S300).

For example, blue binning pixel data may be generated based on pixel data corresponding to the selected blue pixels, red binning pixel data may be generated based on pixel data corresponding to the selected red pixels, and green binning pixel data may be generated based on pixel data corresponding to the selected green pixels.

In an exemplary embodiment of the present inventive concept, the binning pixel data may be generated by performing an arithmetic average operation on the pixel data corresponding to the selected pixels.

Figure 6:
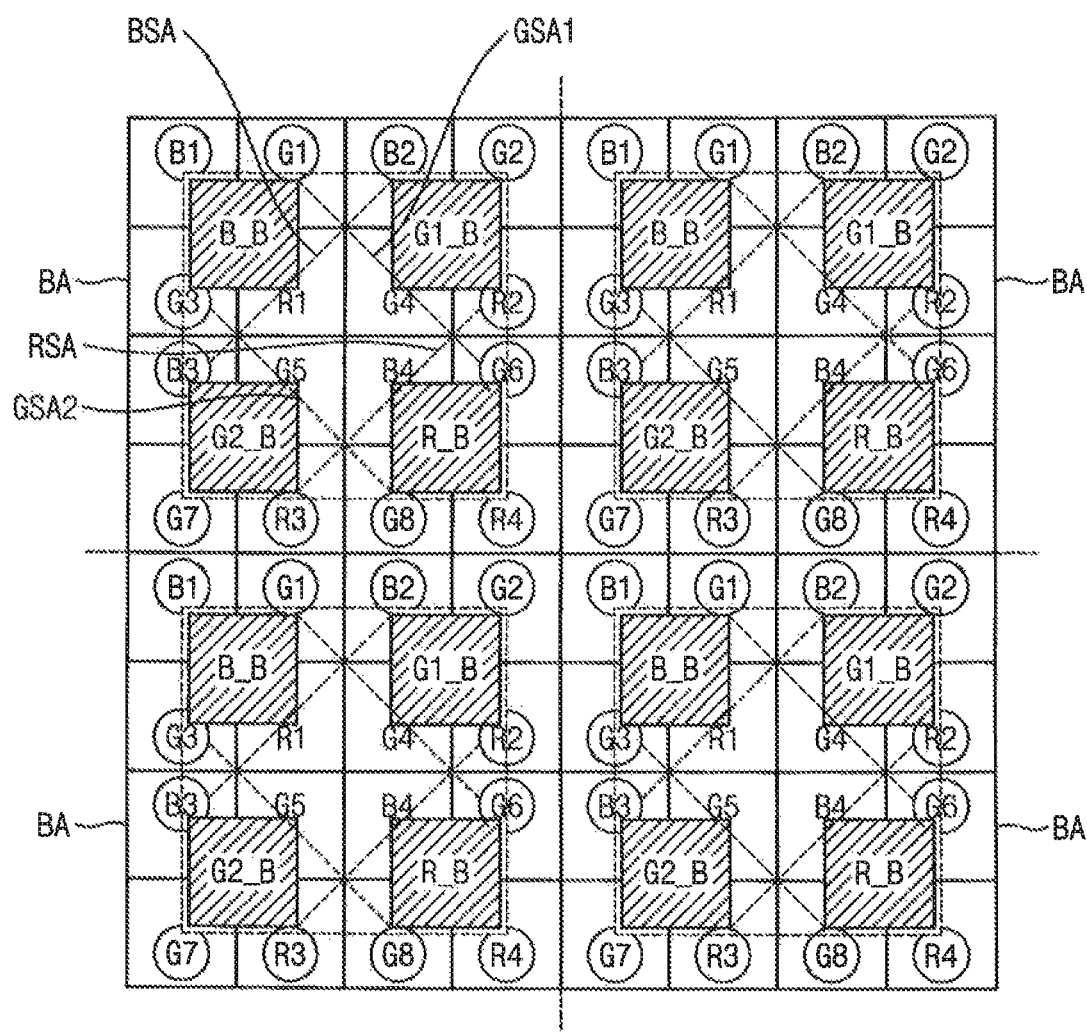
FIGS. 6, 7 and 8 are diagrams for describing generating binning pixel data based on pixel data corresponding to selected pixels of FIG. 1, according to an exemplary embodiment of the present inventive concept.
Figure 7:
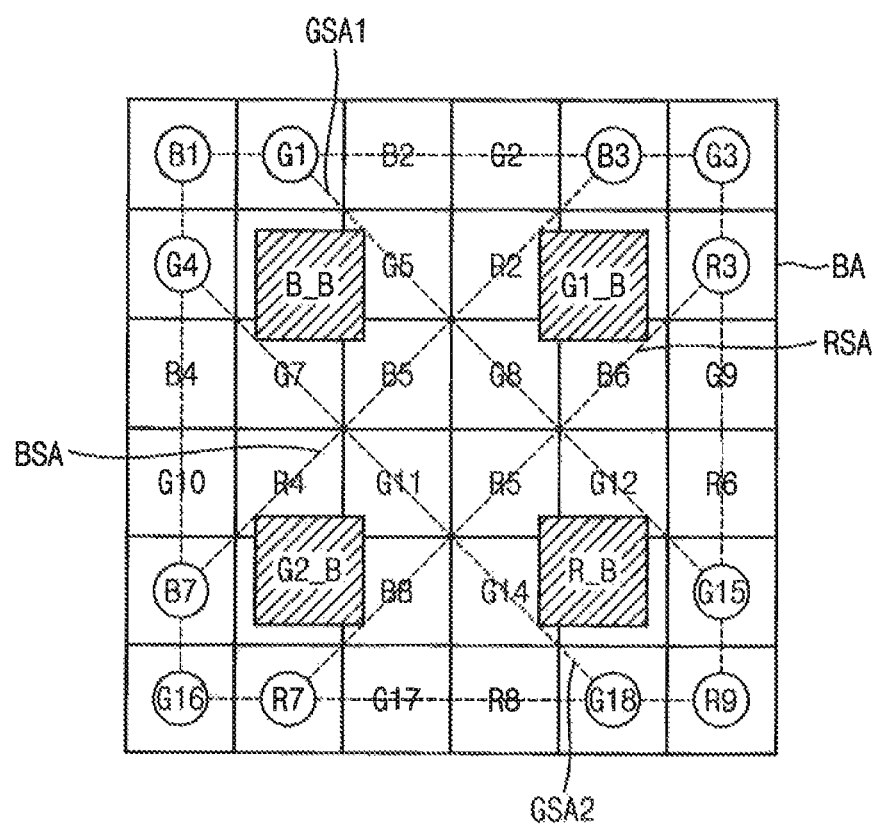
Figure 8:
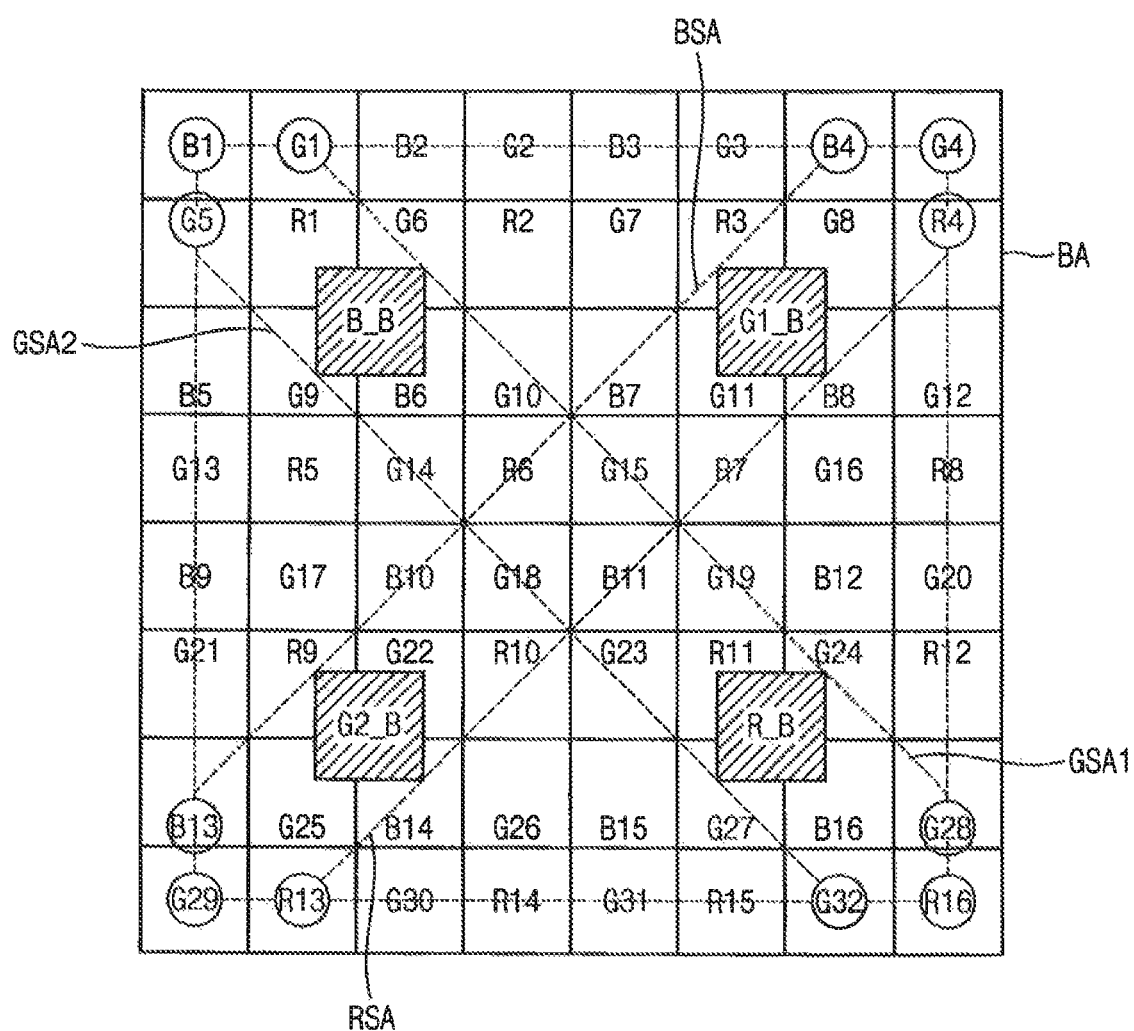

FIGS. 6, 7 and 8 are diagrams for describing generating binning pixel data based on pixel data corresponding to the selected pixels of FIG. 1, according to an exemplary embodiment of the present inventive concept.

FIG. 6 illustrates the binning pixel data generated by performing an arithmetic average operation on the pixel data corresponding to the selected pixels of FIG. 3 when n is two such that each of the binning areas BA includes 4*4 pixels.

In FIG. 6, squares having slashed lines represent the binning pixel data.

Referring to FIG. 6, blue binning pixel data B_B may be generated by performing an arithmetic average operation on first through third pixel data corresponding to the first through third blue pixels B1, B2 and B3 of FIG. 3, respectively. Therefore, the blue binning pixel data B_B may represent an image at a center of gravity of the blue selection area BSA, which is formed by connecting the first through third blue pixels B1, B2 and B3 with each other.

Hereinafter, when the binning pixel data represents an image at a location, the binning pixel data may be referred to as being generated at the location.

Red binning pixel data R_B may be generated by performing an arithmetic average operation on first through third pixel data corresponding to the first through third red pixels R4, R3 and R2 of FIG. 3, respectively. Therefore, the red binning pixel data R_B may represent an image at a center of gravity of the red selection area RSA, which is formed by connecting the first through third red pixels R4, R3 and R2 with each other.

First green binning pixel data G1_B may be generated by performing an arithmetic average operation on first through third pixel data corresponding to the first set of the first through third green pixels G2, G1 and G6 of FIG. 3, respectively. Therefore, the first green binning pixel data G1_B may represent an image at a center of gravity of the first green selection area GSA1, which is formed by connecting the first set of the first through third green pixels G2, G1 and G6 with each other.

Second green binning pixel data G2_B may be generated by performing an arithmetic average operation on first through third pixel data corresponding to the second set of the first through third green pixels G7, G8 and G3 of FIG. 3, respectively. Therefore, the second green binning pixel data G2_B may represent an image at a center of gravity of the second green selection area GSA2, which is formed by connecting the second set of the first through third green pixels G7, G8 and G3 with each other.

Referring to FIG. 6, the blue binning pixel data B_B, the red binning pixel data R_B, the first green binning pixel data G1_B and the second green binning pixel data G2_B may be generated in each of the binning areas BA. Since each of the binning areas BA includes 4*4 pixels, a size of binning image data, which includes the binning pixel data, generated by the method of binning pixels of FIG. 1 may correspond to one-fourth (¼) of a size of original image data when n is two.

FIG. 7 illustrates the binning pixel data generated by performing an arithmetic average operation on the pixel data corresponding to the selected pixels of FIG. 4 when n is three such that each of the binning areas BA includes 6*6 pixels.

In FIG. 7, squares having slashed lines represent the binning pixel data.

Referring to FIG. 7, blue binning pixel data B_B may be generated by performing an arithmetic average operation on first through third pixel data corresponding to the first through third blue pixels B1, B3 and B7 of FIG. 4, respectively. Therefore, the blue binning pixel data B_B may represent an image at a center of gravity of the blue selection area BSA, which is formed by connecting the first through third blue pixels B1, B3 and B7 with each other.

Red binning pixel data R_B may be generated by performing an arithmetic average operation on first through third pixel data corresponding to the first through third red pixels R9, R7 and R3 of FIG. 4, respectively. Therefore, the red binning pixel data R_B may represent an image at a center of gravity of the red selection area RSA, which is formed by connecting the first through third red pixels R9, R7 and R3 with each other.

First green binning pixel data G1_B may be generated by performing an arithmetic average operation on first through third pixel data corresponding to the first set of the first through third green pixels G3, G1 and G15 of FIG. 4, respectively. Therefore, the first green binning pixel data G1_B may represent an image at a center of gravity of the first green selection area GSA1, which is formed by connecting the first set of the first through third green pixels G3, G1 and G15 with each other.

Second green binning pixel data G2_B may be generated by performing an arithmetic average operation on first through third pixel data corresponding to the second set of the first through third green pixels G16, G18 and G4 of FIG. 4, respectively. Therefore, the second green binning pixel data G2_B may represent an image at a center of gravity of the second green selection area GSA2, which is formed by connecting the second set of the first through third green pixels G16, G18 and G4 with each other.

Referring to FIG. 7, the blue binning pixel data B_B, the red binning pixel data R_B, the first green binning pixel data G1_B and the second green binning pixel data G2_B may be generated in each of the binning areas BA. Since each of the binning areas BA includes 6*6 pixels, a size of binning image data, which includes the binning pixel data, generated by the method of binning pixels of FIG. 1 may correspond to one-ninth (⅑) of a size of original image data when n is three.

FIG. 8 illustrates the binning pixel data generated by performing an arithmetic average operation on the pixel data corresponding to the selected pixels of FIG. 5 when n is four such that each of the binning areas BA includes 8*8 pixels.

In FIG. 8, squares having slashed lines represent the binning pixel data.

Referring to FIG. 8, blue binning pixel data B_B may be generated by performing an arithmetic average operation on first through third pixel data corresponding to the first through third blue pixels B1, B4 and B13 of FIG. 5, respectively. Therefore, the blue binning pixel data B_B may represent an image at a center of gravity of the blue selection area BSA, which is formed by connecting the first through third blue pixels B1, B4 and B13 with each other.

Red binning pixel data R_B may be generated by performing an arithmetic average operation on first through third pixel data corresponding to the first through third red pixels R16, R13 and R4 of FIG. 5, respectively. Therefore, the red binning pixel data R_B may represent an image at a center of gravity of the red selection area RSA, which is formed by connecting the first through third red pixels R16, R13 and R4 with each other.

First green binning pixel data G1_B may be generated by performing an arithmetic average operation on first through third pixel data corresponding to the first set of the first through third green pixels G4, G1 and G28 of FIG. 5, respectively. Therefore, the first green binning pixel data G1_B may represent an image at a center of gravity of the first green selection area GSA1, which is formed by connecting the first set of the first through third green pixels G4, G1 and G28 with each other.

Second green binning pixel data G2_B may be generated by performing an arithmetic average operation on first through third pixel data corresponding to the second set of the first through third green pixels G29, G32 and G5 of FIG. 5, respectively. Therefore, the second green binning pixel data G2_B may represent an image at a center of gravity of the second green selection area GSA2, which is formed by connecting the second set of the first through third green pixels G29, G32 and G5 with each other.

Referring to FIG. 8, the blue binning pixel data B_B, the red binning pixel data R_B, the first green binning pixel data G1_B and the second green binning pixel data G2_B may be generated in each of the binning areas BA. Since each of the binning areas BA includes 8*8 pixels, a size of binning image data, which includes the binning pixel data, generated by the method of binning pixels of FIG. 1 may correspond to one-sixteenth (1/16) of a size of original image data when n is four.

When each of the binning areas BA includes (2n)*(2n) pixels, a size of binning image data, which includes the binning pixel data, generated by the method of binning pixels of FIG. 1 may correspond to $1/n^2$ of a size of original image data.

As illustrated in FIGS. 6, 7 and 8, since the blue binning pixel data B_B, the red binning pixel data R_B, the first green binning pixel data G1_B and the second green binning pixel data G2_B are generated at distributed locations in the pixel array PA, noise of zig zag patterns, which occurs when the binning pixel data are not generated at distributed locations in the pixel array, may be reduced.

Therefore, the method of binning pixels according to an exemplary embodiment of the present inventive concept may increase a quality of the binning image data.

In an exemplary embodiment of the present inventive concept, the binning pixel data may be generated by performing a weighted average operation on the pixel data corresponding to the selected pixels.

In this case, the locations at which the binning pixel data are generated may be adjusted by controlling weight values applied to the selected pixels.

Figure 9:
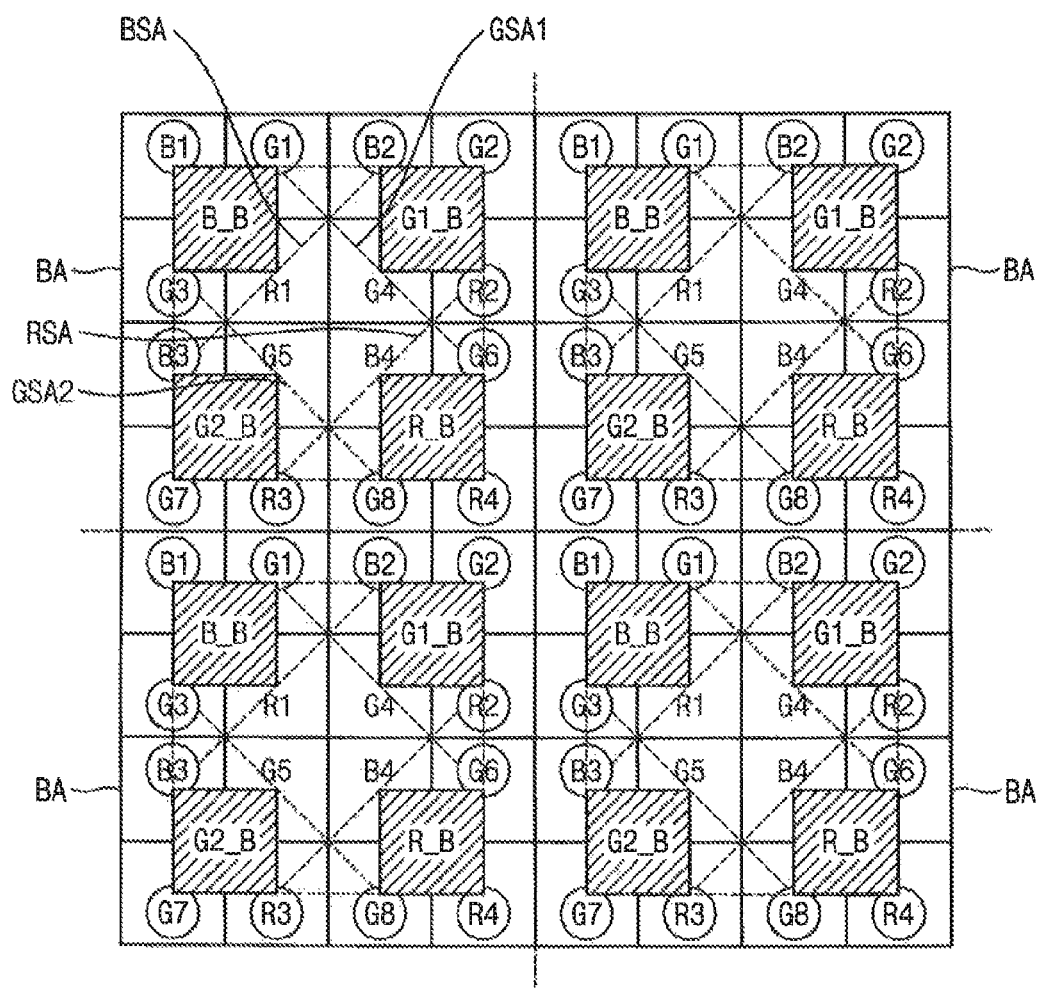
FIGS. 9, 10 and 11 are diagrams for describing generating binning pixel data based on pixel data corresponding to selected pixels of FIG. 1, according to an exemplary embodiment of the present inventive concept.
Figure 10:
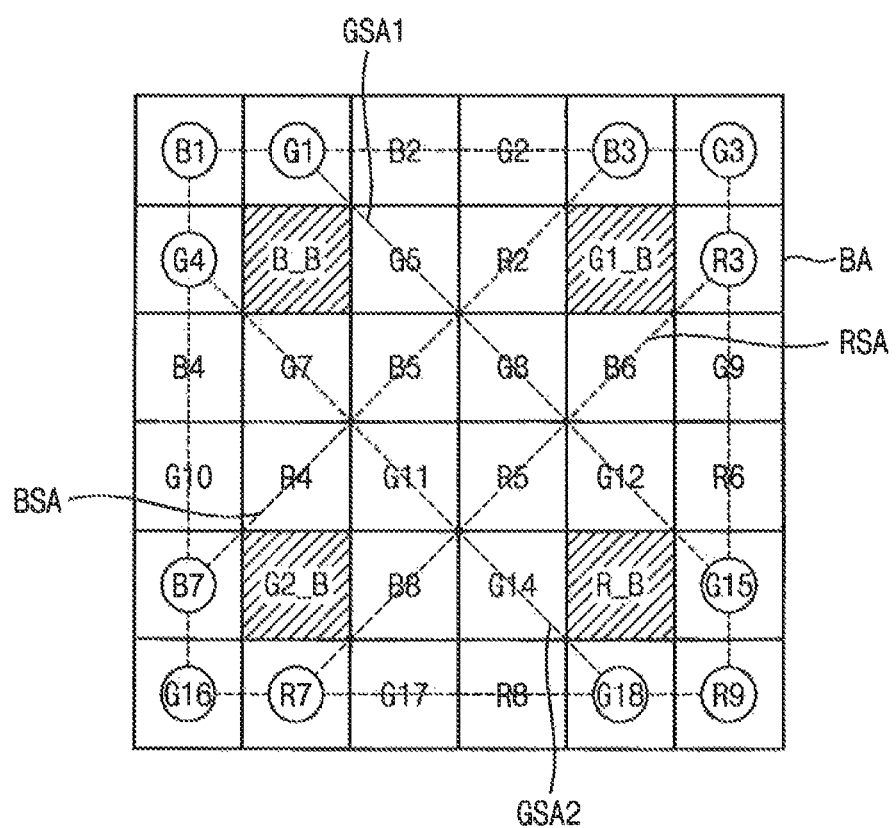
Figure 11:
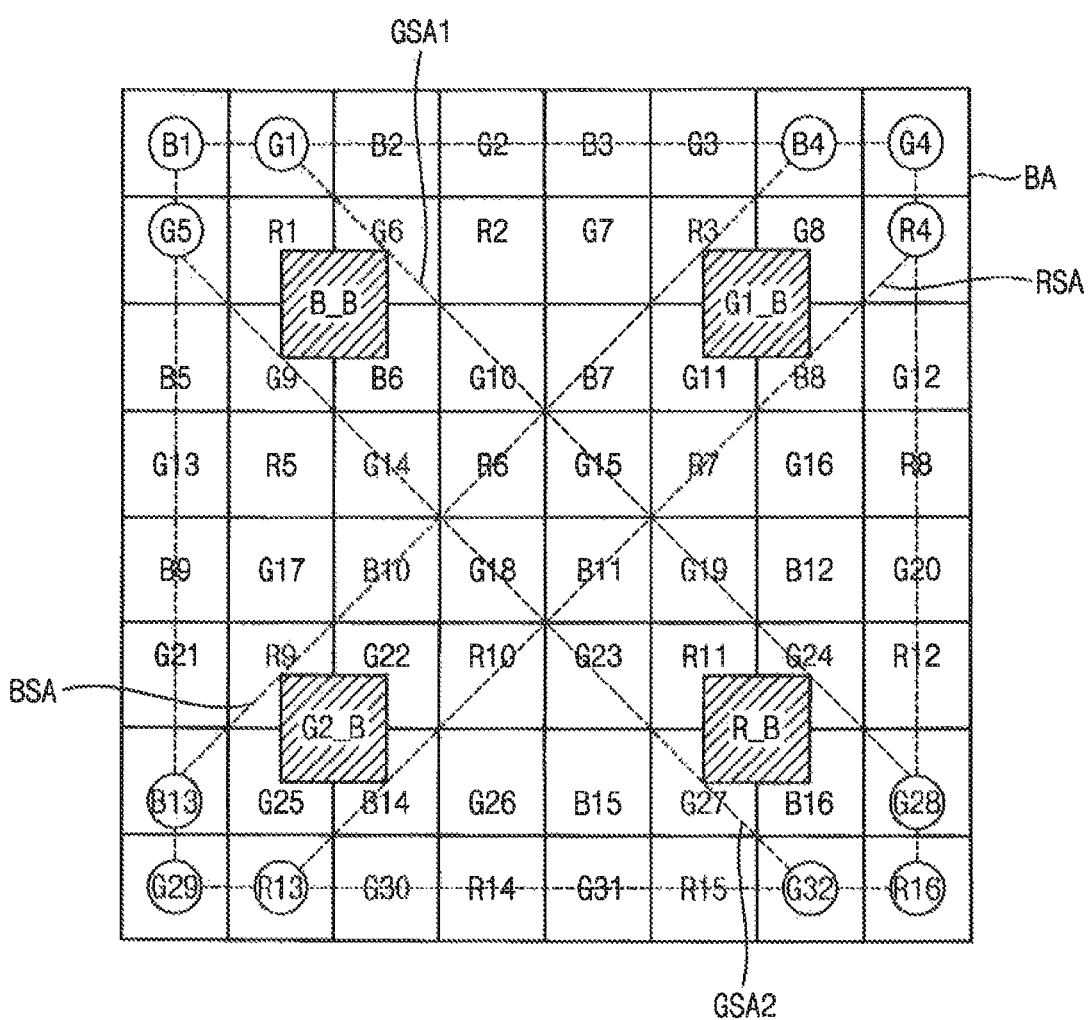

FIGS. 9, 10 and 11 are diagrams for describing generating binning pixel data based on pixel data corresponding to the selected pixels of FIG. 1, according to an exemplary embodiment of the present inventive concept.

FIG. 9 illustrates the binning pixel data generated by performing a weighted average operation on the pixel data corresponding to the selected pixels of FIG. 3 when n is two such that each of the binning areas BA includes 4*4 pixels.

As described above with reference to FIG. 6, when the blue binning pixel data B_B, the red binning pixel data R_B, the first green binning pixel data G1_B and the second green binning pixel data G2_B are generated by performing an arithmetic average operation on pixel data corresponding to the first through third blue pixels B1, B2 and B3, performing an arithmetic average operation on pixel data corresponding to the first through third red pixels R4, R3 and R2, performing an arithmetic average operation on pixel data corresponding to the first set of the first through third green pixels G2, G1 and G6, and performing an arithmetic average operation on pixel data corresponding to the second set of the first through third green pixels G7, G8 and G3 of FIG. 3, respectively, the blue binning pixel data B_B, the red binning pixel data R_B, the first green binning pixel data G1_B and the second green binning pixel data G2_B may be generated at the centers of gravity of the blue selection area BSA, the red selection area RSA, the first green selection area GSA1, and the second green selection area GSA2, respectively.

In this case, as illustrated in FIG. 6, the blue binning pixel data B_B, the red binning pixel data R_B, the first green binning pixel data G1_B and the second green binning pixel data G2_B may be not generated at evenly distributed locations in the pixel array PA.

When the blue binning pixel data B_B, the red binning pixel data R_B, the first green binning pixel data G1_B and the second green binning pixel data G2_B are generated at first through fourth locations K1, K2, K3 and K4 of FIG. 3, respectively, the blue binning pixel data B_B, the red binning pixel data R_B, the first green binning pixel data G1_B and the second green binning pixel data G2_B may be evenly distributed in the pixel array PA.

Referring to FIGS. 3 and 6, when a first weight value, which is applied to the first blue pixel B1, the first red pixel R4, the first green pixel G2 of the first set and the first green pixel G7 of the second set, is greater than a second weight value, which is applied to the second blue pixel B2, the second red pixel R3, the second green pixel G1 of the first set and the second green pixel G8 of the second set, and a third weight value, which is applied to the third blue pixel B3, the third red pixel R2, the third green pixel G6 of the first set and the third green pixel G3 of the second set, locations at which the blue binning pixel data B_B, the red binning pixel data R_B, the first green binning pixel data G1_B and the second green binning pixel data G2_B are generated may be moved to the first blue pixel B1, the first red pixel R4, the first green pixel G2 of the first set and the first green pixel G7 of the second set, respectively.

For example, when the second weight value is equal to the third weight value and the first weight value is twice the second weight value and the third weight value, the blue binning pixel data B_B, the red binning pixel data R_B, the first green binning pixel data G1_B and the second green binning pixel data G2_B may be generated at the first through fourth locations K1, K2, K3 and K4 of FIG. 3, respectively, as illustrated in FIG. 9.

FIG. 10 illustrates the binning pixel data generated by performing a weighted average operation on the pixel data corresponding to the selected pixels of FIG. 4 when n is three such that each of the binning areas BA includes 6*6 pixels.

As described above with reference to FIG. 7, when the blue binning pixel data B_B, the red binning pixel data R_B, the first green binning pixel data G1_B and the second green binning pixel data G2_B are generated by performing an arithmetic average operation on pixel data corresponding to the first through third blue pixels B1, B3 and B7, performing an arithmetic average operation on pixel data corresponding to the first through third red pixels R9, R7 and R3, performing an arithmetic average operation on pixel data corresponding to the first set of the first through third green pixels G3, G1 and G15, and performing an arithmetic average operation on pixel data corresponding to the second set of the first through third green pixels G16, G18 and G4 of FIG. 4, respectively, the blue binning pixel data B_B, the red binning pixel data R_B, the first green binning pixel data G1_B and the second green binning pixel data G2_B may be generated at the centers of gravity of the blue selection area BSA, the red selection area RSA, the first green selection area GSA1, and the second green selection area GSA2, respectively.

In this case, as illustrated in FIG. 7, the blue binning pixel data B_B, the red binning pixel data R_B, the first green binning pixel data G1_B and the second green binning pixel data G2_B may be not generated at evenly distributed locations in the pixel array PA.

When the blue binning pixel data B_B, the red binning pixel data R_B, the first green binning pixel data G1_B and the second green binning pixel data G2_B are generated at first through fourth locations K1, K2, K3 and K4 of FIG. 4, respectively, the blue binning pixel data B_B, the red binning pixel data R_B, the first green binning pixel data G1_B and the second green binning pixel data G2_B may be evenly distributed in the pixel array PA.

Referring to FIGS. 4 and 7, when a first weight value, which is applied to the first blue pixel B1, the first red pixel R9, the first green pixel G3 of the first set and the first green pixel G16 of the second set, is greater than a second weight value, which is applied to the second blue pixel B3, the second red pixel R7, the second green pixel G11 of the first set and the second green pixel G18 of the second set, and a third weight value, which is applied to the third blue pixel B7, the third red pixel R3, the third green pixel G15 of the first set and the third green pixel G4 of the second set, locations at which the blue binning pixel data B_B, the red binning pixel data R_B, the first green binning pixel data G1_B and the second green binning pixel data G2_B are generated may be moved to the first blue pixel B1, the first red pixel R9, the first green pixel G3 of the first set and the first green pixel G16 of the second set, respectively.

For example, when the second weight value is equal to the third weight value and the first weight value is twice the second weight value and the third weight value, the blue binning pixel data B_B, the red binning pixel data R_B, the first green binning pixel data G1_B and the second green binning pixel data G2_B may be generated at the first through fourth locations K1, K2, K3 and K4 of FIG. 4, respectively, as illustrated in FIG. 10.

FIG. 11 illustrates the binning pixel data generated by performing a weighted average operation on the pixel data corresponding to the selected pixels of FIG. 5 when n is four such that each of the binning areas BA includes 8*8 pixels.

As described above with reference to FIG. 8, when the blue binning pixel data B_B, the red binning pixel data R_B, the first green binning pixel data G1_B and the second green binning pixel data G2_B are generated by performing an arithmetic average operation on pixel data corresponding to the first through third blue pixels B1, B4 and B13, performing an arithmetic average operation on pixel data corresponding to the first through third red pixels R16, R13 and R4, performing an arithmetic average operation on pixel data corresponding to the first set of the first through third green pixels G4, G1 and G28, and performing an arithmetic average operation on pixel data corresponding to the second set of the first through third green pixels G29, G32 and G5 of FIG. 5, respectively, the blue binning pixel data B_B, the red binning pixel data R_B, the first green binning pixel data G1_B and the second green binning pixel data G2_B may be generated at the centers of gravity of the blue selection area BSA, the red selection area RSA, the first green selection area GSA1, and the second green selection area GSA2, respectively.

In this case, as illustrated in FIG. 8, the blue binning pixel data B_B, the red binning pixel data R_B, the first green binning pixel data G1_B and the second green binning pixel data G2_B may be not generated at evenly distributed locations in the pixel array PA.

When the blue binning pixel data B_B, the red binning pixel data R_B, the first green binning pixel data G1_B and the second green binning pixel data G2_B are generated at first through fourth locations K1, K2, K3 and K4 of FIG. 5, respectively, the blue binning pixel data B_B, the red binning pixel data R_B, the first green binning pixel data G1_B and the second green binning pixel data G2_B may be evenly distributed in the pixel array PA.

Referring to FIGS. 5 and 8, when a first weight value, which is applied to the first blue pixel B1, the first red pixel R16, the first green pixel G4 of the first set and the first green pixel G29 of the second set, is greater than a second weight value, which is applied to the second blue pixel B4, the second red pixel R13, the second green pixel G1 of the first set and the second green pixel G32 of the second set, and a third weight value, which is applied to the third blue pixel B13, the third red pixel R4, the third green pixel G28 of the first set and the third green pixel G5 of the second set, locations at which the blue binning pixel data B_B, the red binning pixel data R_B, the first green binning pixel data G1_B and the second green binning pixel data G2_B are generated may be moved to the first blue pixel B1, the first red pixel R16, the first green pixel G4 of the first set and the first green pixel G29 of the second set, respectively.

For example, when the second weight value is equal to the third weight value and the first weight value is twice the second weight value and the third weight value, the blue binning pixel data B_B, the red binning pixel data R_B, the first green binning pixel data G1_B and the second green binning pixel data G2_B may be generated at the first through fourth locations K1, K2, K3 and K4 of FIG. 5, respectively, as illustrated in FIG. 11.

As described above with reference to FIGS. 9, 10 and 11, when the binning pixel data are generated by performing a weighted average operation on the pixel data corresponding to the selected pixels, the binning pixel data may be more evenly distributed in the pixel array PA.

Therefore, the method of binning pixels according to an exemplary embodiment of the present inventive concept may further increase a quality of the binning image data.

In an exemplary embodiment of the present inventive concept, when selecting a different number of pixels having a same color from each of at least two rows in each of the binning areas BA (step S200), two rows may be selected for each of the blue pixels B, the green pixels G and the red pixels R in each of the binning areas BA, a first pixel and a second pixel having a same color as each other may be determined from one of the selected two rows, a third pixel having the same color as the first pixel and the second pixel may be determined from the other one of the selected two rows, and all of the pixels that have the same color as the first through third pixels and are included in a selection area formed by connecting the first through third pixels with each other may be selected.

Since the number of the green pixels G is twice of the number of the blue pixels B and the number of the red pixels R in the Bayer pattern, one set of the first through third pixels may be determined for the blue pixels B in each of the binning areas BA, one set of the first through third pixels may be determined for the red pixels R in each of the binning areas BA, and two sets of the first through third pixels may be determined for the green pixels G in each of the binning areas BA. After that, for each of the sets of the first through third pixels, all of the pixels that have the same color as the first through third pixels and are included in the selection area formed by connecting the first through third pixels with each other may be selected.

In an exemplary embodiment of the present inventive concept, the first pixel may be located at a vertex of the binning area BA, and the third pixel and the first pixel may be located in a same column.

Since the second pixel and the first pixel are located in a same row, the selection area formed by connecting the first through third pixels with each other may have a right-angled triangle shape.

In an exemplary embodiment of the present inventive concept, the second pixel may correspond to a pixel that has a same color as the first pixel and is farthest from the first pixel in a row direction in the binning area BA, and the third pixel may correspond to a pixel that has a same color as the first pixel and is farthest from the first pixel in a column direction in the binning area BA.

In this case, the selection area formed by connecting the first through third pixels with each other may have a right-angled isosceles triangle shape.

Figure 12:
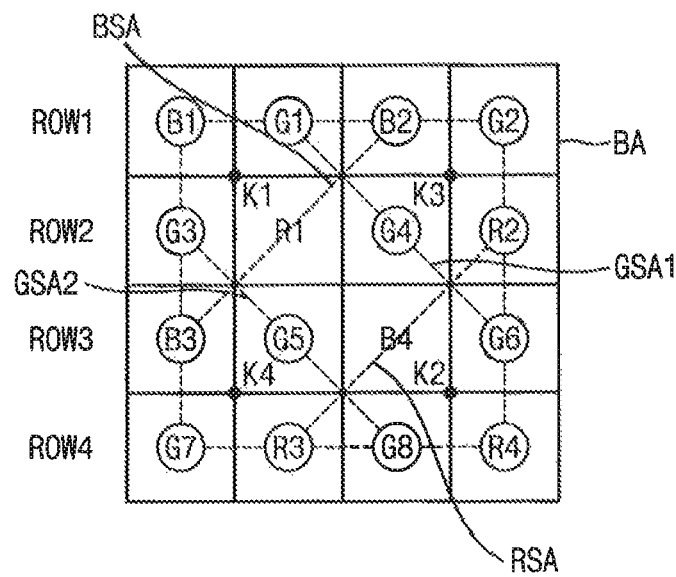
FIGS. 12, 13 and 14 are diagrams for describing selecting a different number of pixels having a same color from each of at least two rows in each binning area of FIG. 1, according to an exemplary embodiment of the present inventive concept.
Figure 13:
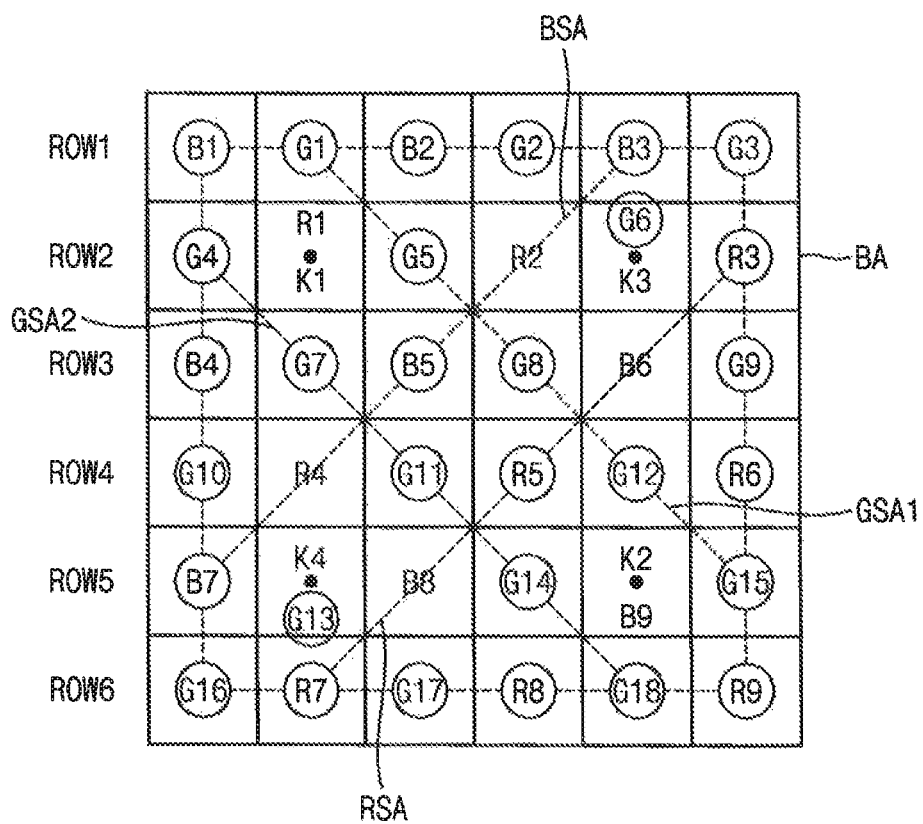
Figure 14:
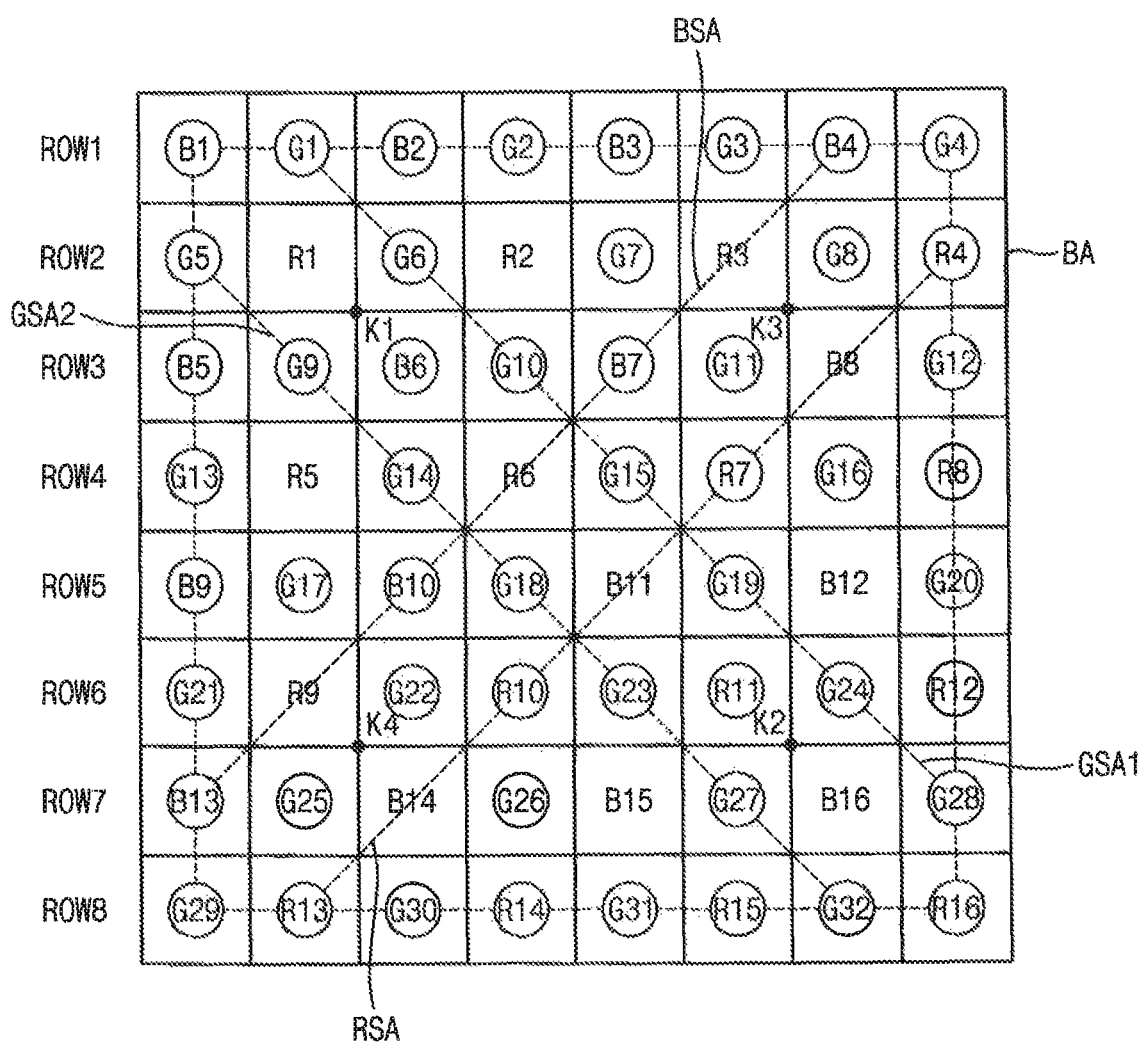

FIGS. 12, 13 and 14 are diagrams for describing selecting a different number of pixels having a same color from each of at least two rows in each of the binning areas of FIG. 1, according to an exemplary embodiment of the present inventive concept.

In FIG. 12, n is two such that each of the binning areas BA includes 4*4 pixels. In FIG. 13, n is three such that each of the binning areas BA includes 6*6 pixels. In FIG. 14, n is four such that each of the binning areas BA includes 8*8 pixels.

In FIGS. 12, 13 and 14, pixels having a circle mark represent the selected pixels.

In FIG. 12, the binning area BA includes first through fourth rows ROW1, ROW2, ROW3 and ROW4.

Referring to FIG. 12, one set of first through third blue pixels B1, B2 and B3 may be determined for the blue pixels B, one set of first through third red pixels R4, R3 and R2 may be determined for the red pixels R, a first set of first through third green pixels G2, G1 and G6 may be determined for the green pixels G, and a second set of first through third green pixels G7, G8 and G3 may be determined for the green pixels G.

The method of determining the first through third blue pixels B1, B2 and B3, the first through third red pixels R4, R3 and R2, the first set of the first through third green pixels G2, G1 and G6, and the second set of the first through third green pixels G7, G8 and G3 in FIG. 12 may be the same as the method of selecting the first through third blue pixels B1, B2 and B3, the first through third red pixels R4, R3 and R2, the first set of the first through third green pixels G2, G1 and G6, and the second set of the first through third green pixels G7, G8 and G3 in FIG. 3. Therefore, duplicated description will be omitted here.

After that, all of blue pixels B1, B2 and B3 that are included in a blue selection area BSA, which is formed by connecting the first through third blue pixels B1, B2 and B3 with each other, may be selected. All of red pixels R4, R3 and R2 that are included in a red selection area RSA, which is formed by connecting the first through third red pixels R4, R3 and R2 with each other, may be selected. All of green pixels G2, G1, G4 and G6 that are included in a first green selection area GSA1, which is formed by connecting the first set of the first through third green pixels G2, G1 and G6 with each other, may be selected. All of green pixels G7, G8, G5 and G3 that are included in a second green selection area GSA2, which is formed by connecting the second set of the first through third green pixels G7, G8 and G3 with each other, may be selected.

In FIG. 13, the binning area BA includes first through sixth rows ROW1, ROW2, ROW3, ROW4, ROW5 and ROW6.

Referring to FIG. 13, one set of first through third blue pixels B1, B3 and B7 may be determined for the blue pixels B, one set of first through third red pixels R9, R7 and R3 may be determined for the red pixels R, a first set of first through third green pixels G3, G1 and G15 may be determined for the green pixels G, and a second set of first through third green pixels G16, G18 and G4 may be determined for the green pixels G.

The method of determining the first through third blue pixels B1, B3 and B7, the first through third red pixels R9, R7 and R3, the first set of the first through third green pixels G3, G1 and G15, and the second set of the first through third green pixels G16, G18 and G4 in FIG. 13 may be the same as the method of selecting the first through third blue pixels B1, B3 and B7, the first through third red pixels R9, R7 and R3, the first set of the first through third green pixels G3, G1 and G15, and the second set of the first through third green pixels G16, G18 and G4 in FIG. 4. Therefore, duplicated description will be omitted here.

After that, all of blue pixels B1, B2, B4, B3, B5 and B7 that are included in a blue selection area BSA, which is formed by connecting the first through third blue pixels B1, B3 and B7 with each other, may be selected. All of red pixels R9, R8, R6, R7, R5 and R3 that are included in a red selection area RSA, which is formed by connecting the first through third red pixels R9, R7 and R3 with each other, may be selected. All of green pixels G3, G2, G6, G9, G1, G5, G8, G12 and G15 that are included in a first green selection area GSA1, which is formed by connecting the first set of the first through third green pixels G3, G1 and G15 with each other, may be selected. All of green pixels G16, G17, G13, G10, G18, G14, G11, G7 and G4 that are included in a second green selection area GSA2, which is formed by connecting the second set of the first through third green pixels G16, G18 and G4 with each other, may be selected.

In FIG. 14, the binning area BA includes first through eighth rows ROW1, ROW2, ROW3, ROW4, ROW5, ROW6, ROW7 and ROW8.

Referring to FIG. 14, one set of first through third blue pixels B1, B4 and B13 may be determined for the blue pixels B, one set of first through third red pixels R16, R13 and R4 may be determined for the red pixels R, a first set of first through third green pixels G4, G1 and G28 may be determined for the green pixels G, and a second set of first through third green pixels G29, G32 and G5 may be determined for the green pixels G.

The method of determining the first through third blue pixels B, B4 and B13, the first through third red pixels R16, R13 and R4, the first set of the first through third green pixels G4, G1 and G28, and the second set of the first through third green pixels G29, G32 and G5 in FIG. 14 may be the same as the method of selecting the first through third blue pixels B1, B4 and B13, the first through third red pixels R16, R13 and R4, the first set of the first through third green pixels G4, G1 and G28, and the second set of the first through third green pixels G29, G32 and G5 in FIG. 5. Therefore, duplicated description will be omitted here.

After that, all of blue pixels B1, B2, B5, B3, B6, B9, B4, B7, B10 and B13 that are included in a blue selection area BSA, which is formed by connecting the first through third blue pixels B1, B4 and B13 with each other, may be selected. All of red pixels R16, R15, R12, R14, R11, R8, R13, R10, R7 and R4 that are included in a red selection area RSA, which is formed by connecting the first through third red pixels R16, R13 and R4 with each other, may be selected. All of green pixels G4, G3, G8, G12, G2, G7, G11, G16, G20, G1, G6, G10, G15, G19, G24 and G28 that are included in a first green selection area GSA1, which is formed by connecting the first set of the first through third green pixels G4, G1 and G28 with each other, may be selected. All of green pixels G29, G30, G25, G21, G31, G26, G22, G17, G13, G32, G27, G23, G18, G14, G9 and G5 that are included in a second green selection area GSA2, which is formed by connecting the second set of the first through third green pixels G29, G32 and G5 with each other, may be selected.

Referring again to FIG. 1, binning pixel data is generated based on pixel data corresponding to the selected pixels (step S300).

For example, blue binning pixel data may be generated based on pixel data corresponding to the selected blue pixels, red binning pixel data may be generated based on pixel data corresponding to the selected red pixels, and green binning pixel data may be generated based on pixel data corresponding to the selected green pixels.

In an exemplary embodiment of the present inventive concept, the binning pixel data may be generated by performing an arithmetic average operation on the pixel data corresponding to the selected pixels.

In this case, the binning pixel data may be generated at locations similar to the locations at which the binning pixel data are generated in FIGS. 6, 7 and 8.

For example, when n is two such that each of the binning areas BA includes 4*4 pixels, blue binning pixel data B_B may be generated at a center of gravity of the selected blue pixels B1, B2 and B3 of FIG. 12, red binning pixel data R_B may be generated at a center of gravity of the selected red pixels R4, R3 and R2 of FIG. 12, first green binning pixel data G1_B may be generated at a center of gravity of the selected green pixels G2, G1, G4 and G6 of FIG. 12, and second green binning pixel data G2_B may be generated at a center of gravity of the selected green pixels G7, G8, G5 and G3 of FIG. 12. Therefore, a size of binning image data, which includes the binning pixel data, generated by the method of binning pixels of FIG. 1 may correspond to one-fourth (¼) of a size of original image data when n is two.

For example, when n is three such that each of the binning areas BA includes 6*6 pixels, blue binning pixel data B_B may be generated at a center of gravity of the selected blue pixels B1, B2, B4, B3, B5 and B7 of FIG. 13, red binning pixel data R_B may be generated at a center of gravity of the selected red pixels R9, R8, R6, R7, R5 and R3 of FIG. 13, first green binning pixel data G1_B may be generated at a center of gravity of the selected green pixels G3, G2, G6, G9, G1, G5, G8, G12 and G15 of FIG. 13, and second green binning pixel data G2_B may be generated at a center of gravity of the selected green pixels G16, G17, G13, G10, G18, G14, G11, G7 and G4 of FIG. 13. Therefore, a size of binning image data, which includes the binning pixel data, generated by the method of binning pixels of FIG. 1 may correspond to one-ninth (⅑) of a size of original image data when n is three.

For example, when n is four such that each of the binning areas BA includes 8*8 pixels, blue binning pixel data B_B may be generated at a center of gravity of the selected blue pixels B1, B2, B5, B3, B6, B9, B4, B7, B10 and B13 of FIG. 14, red binning pixel data R_B may be generated at a center of gravity of the selected red pixels R16, R15, R12, R14, R11, R8, R13, R10, R7 and R4 of FIG. 14, first green binning pixel data G1_B may be generated at a center of gravity of the selected green pixels G4, G3, G8, G12, G2, G7, G11, G16, G20, G1, G6, G10, G15, G19, G24 and G28 of FIG. 14, and second green binning pixel data G2_B may be generated at a center of gravity of the selected green pixels G29, G30, G25, G21, G31, G26, G22, G17, G13, G32, G27, G23, G18, G14, G9 and G5 of FIG. 14. Therefore, a size of binning image data, which includes the binning pixel data, generated by the method of binning pixels of FIG. 1 may correspond to one-sixteenth (1/16) of a size of original image data when n is four.

Therefore, similar to the cases of FIGS. 6, 7 and 8, since the blue binning pixel data B_B, the red binning pixel data R_B, the first green binning pixel data G1_B and the second green binning pixel data G2_B are generated at distributed locations in the pixel array PA, noise of zig zag patterns, which occurs when the binning pixel data are not generated at distributed locations in the pixel array, may be reduced.

Therefore, the method of binning pixels according to an exemplary embodiment of the present inventive concept may increase a quality of the binning image data.

In an exemplary embodiment of the present inventive concept, the binning pixel data may be generated by performing a weighted average operation on the pixel data corresponding to the selected pixels.

In this case, the locations at which the binning pixel data are generated may be adjusted by controlling weight values applied to the selected pixels.

As described above with reference to FIGS. 3 to 11, when the blue binning pixel data B_B, the red binning pixel data R_B, the first green binning pixel data G1_B and the second green binning pixel data G2_B are generated at first through fourth locations K1, K2, K3 and K4 of FIGS. 12, 13 and 14, respectively, the blue binning pixel data B_B, the red binning pixel data R_B, the first green binning pixel data G1_B and the second green binning pixel data G2_B may be evenly distributed in the pixel array PA.

Therefore, as described above with reference to FIGS. 9, 10 and 11, when a first weight value, which is applied to the first pixel located at a vertex of the binning area BA, is greater than weight values applied to the rest of the selected pixels except for the first pixel while performing a weighted average operation, the blue binning pixel data B_B, the red binning pixel data R_B, the first green binning pixel data G1_B and the second green binning pixel data G2_B may be generated at the first through fourth locations K1, K2, K3 and K4 of FIGS. 12, 13 and 14, respectively, as illustrated in FIGS. 9, 10 and 11.

As described above, when the binning pixel data are generated by performing a weighted average operation on the pixel data corresponding to the selected pixels, the binning pixel data may be more evenly distributed in the pixel array PA.

Therefore, the method of binning pixels according to an exemplary embodiment of the present inventive concept may further increase a quality of the binning image data.

Figure 15:
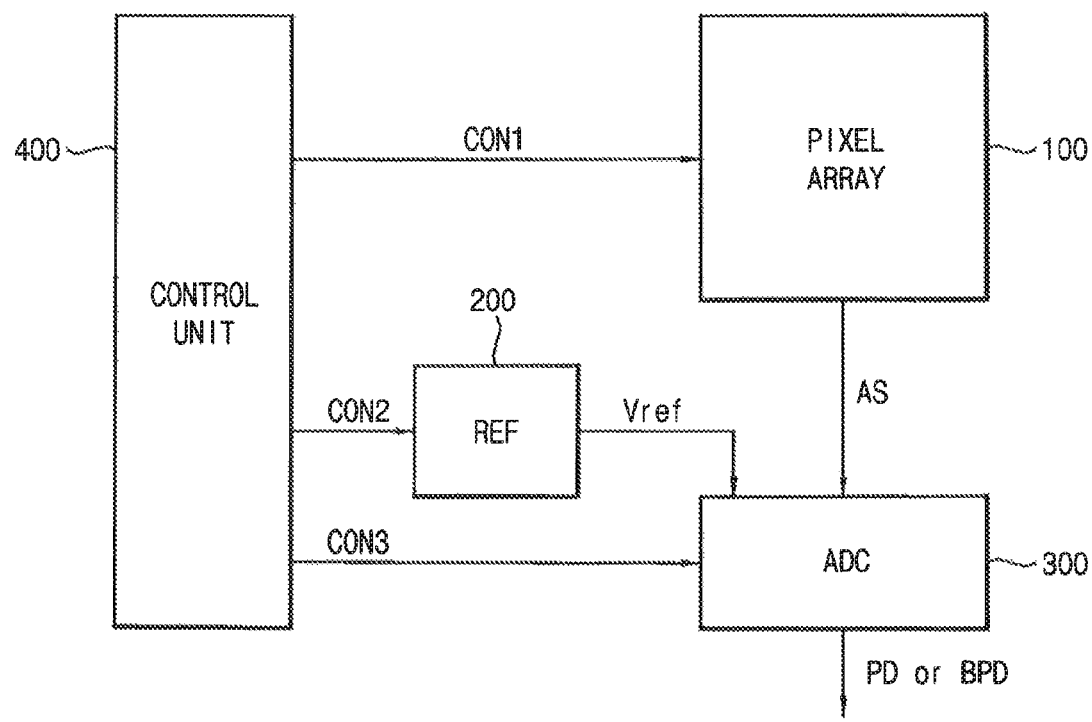
FIG. 15 is a block diagram illustrating an image sensor according to an exemplary embodiment of the present inventive concept.

FIG. 15 is a block diagram illustrating an image sensor according to an exemplary embodiment of the present inventive concept.

The method of binning pixels of FIG. 1 may be performed by an image sensor 10 of FIG. 15.

Hereinafter, an operation of the image sensor 10 will be described with reference to FIGS. 1 to 15.

Referring to FIG. 15, the image sensor 10 includes a pixel array 100, a reference signal generation unit REF 200, an analog-to-digital conversion unit ADC 300 and a control unit 400.

The pixel array 100 includes a plurality of pixels arranged in rows and columns. As illustrated in FIG. 2, the pixel array 100 has a Bayer pattern. For example, the pixel array 100 may include an odd row in which blue pixels B and green pixels G are alternately arranged and an even row in which green pixels G and red pixels R are alternately arranged.

Each of the pixels included in the pixel array 100 detects incident light and generates an analog signal AS in response to the detected incident light.

In a first operation mode, the analog-to-digital conversion unit 300 generates pixel data PD by performing an analog-to-digital conversion on the analog signal AS provided from each of the pixels.

In a second operation mode, the analog-to-digital conversion unit 300 divides the pixel array 100 into a plurality of binning areas BA having a square shape such that each of the binning areas BA includes (2n)*(2n) pixels (step S100). Here, n represents an integer equal to or greater than two. The analog-to-digital conversion unit 300 selects a different number of pixels having a same color from each of at least two rows in each of the binning areas BA (step S200). Therefore, in each of the binning areas BA, the number of the pixels selected from each of the at least two rows may be different from each other. The analog-to-digital conversion unit 300 generates binning pixel data BPD by performing an analog-to-digital conversion and a binning operation on the analog signals AS generated from the selected pixels (step S300).

The first operation mode may be a still image capturing mode and the second operation mode may be a video recording mode.

In an exemplary embodiment of the present inventive concept, the reference signal generation unit 200 may generate a reference signal Vref that changes in a constant rate, and the analog-to-digital conversion unit 300 may perform an analog-to-digital conversion using the reference signal Vref.

The control unit 400 controls an operation of the pixel array 100 using a first control signal CON1, controls an operation of the reference signal generation unit 200 using a second control signal CON2 and controls an operation of the analog-to-digital conversion unit 300 using a third control signal CON3.

Figure 16:
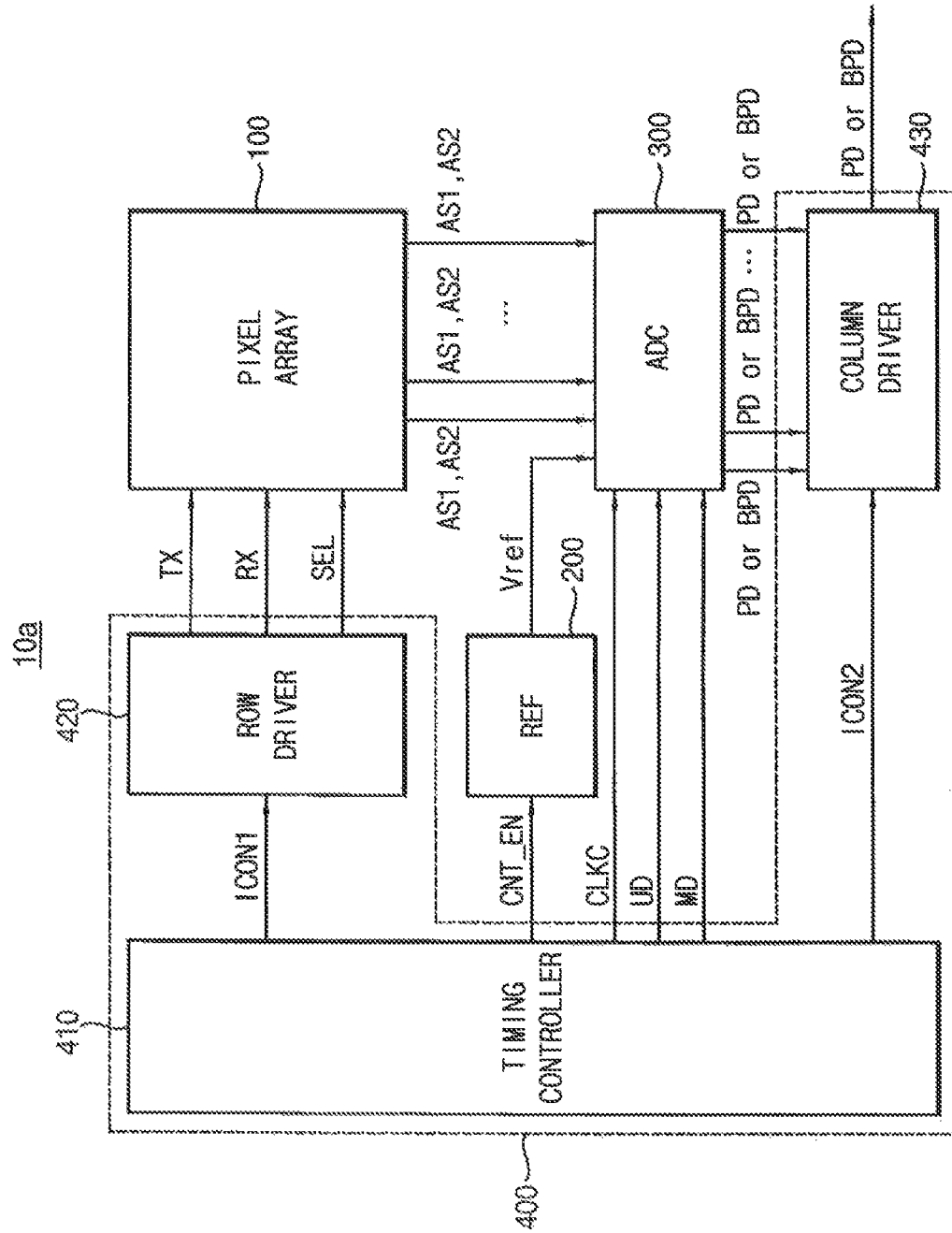
FIG. 16 is a block diagram illustrating an exemplary embodiment of an image sensor of FIG. 15.

FIG. 16 is a block diagram illustrating an exemplary embodiment of an image sensor of FIG. 15.

Referring to FIG. 16, an image sensor 10a may include a pixel array 100, a reference signal generation unit REF 200, an analog-to-digital conversion unit ADC 300 and a control unit 400. The control unit 400 may include a timing controller 410, a row driver 420 and a column driver 430.

The timing controller 410 may provide a first inner control signal ICON1 to the row driver 420, and the row driver 420 may control an operation of the pixel array 100 in a unit of a row in response to the first inner control signal ICON1. For example, the row driver 420 may control the operation of the pixel array 100 in a unit of a row by providing a row selection signal SEL, a reset control signal RX and a transmission control signal TX to the pixel array 100.

Each of the pixels included in the pixel array 100 may generate a first analog signal AS1 corresponding to a reset component and a second analog signal AS2 corresponding to the detected incident light alternately in response to the row selection signal SEL, the reset control signal RX and the transmission control signal TX received from the row driver 420.

Figure 17:
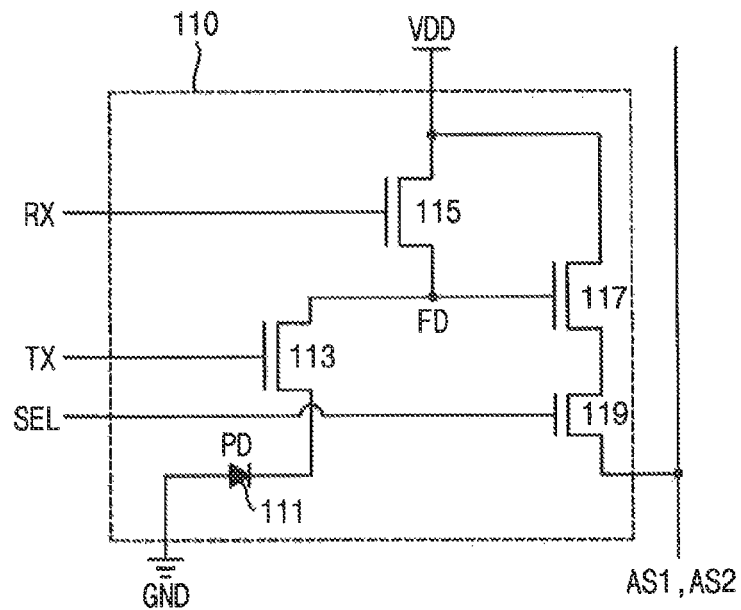
FIG. 17 is a circuit diagram illustrating an exemplary embodiment of a pixel included in a pixel array of FIG. 16.

FIG. 17 is a circuit diagram illustrating an exemplary embodiment of a pixel included in the pixel array 100 of FIG. 16.

Referring to FIG. 17, a pixel 110 may include a photo diode PD 111, a transmission transistor 113, a reset transistor 115, a sensing transistor 117 and a row selection transistor 119.

Hereinafter, an operation of the pixel array 100 will be described with reference to FIGS. 16 and 17.

The row driver 420 may select one of rows included in the pixel array 100 by providing an activated row selection signal SEL to the selected row of the pixel array 100 to turn on the row selection transistor 119. The row driver 420 may provide an activated reset control signal RX to the selected row to turn on the reset transistor 115. Therefore, a voltage of a node FD may be a supply voltage VDD, so that the sensing transistor 117 may be turned on and the first analog signal AS1 representing the reset component of the pixel 110 may be outputted from the pixel 110.

After that, the row driver 420 may deactivate the reset control signal RX. When light is incident on the photo diode 111, the photo diode 111 may generate electron-hole pairs (EHPs). The generated EHPs may be accumulated at a source node of the transmission transistor 113 so that a potential of the source node of the transmission transistor 113 may be changed. The row driver 420 may provide an activated transmission control signal TX to the transmission transistor 113 to turn on the transmission transistor 113, and then electrons of the accumulated EHPs may be transferred to the node FD. The voltage of the node FD, which is a voltage of a gate of the sensing transistor 117, may be changed in response to the number of electrons of the EHPs transferred to the node FD. If the row selection transistor 119 is turned on, the second analog signal AS2 corresponding to the voltage of the node FD may be outputted from the pixel 110.

After that, the row driver 420 may activate the reset control signal RX again to turn on the reset transistor 115 so that the voltage of the node FD may be the supply voltage VDD.

The pixel array 100 and the row driver 420 may repeat the above described operations to generate the first analog signal AS1 and the second analog signal AS2 row by row.

The first analog signal AS1 and the second analog signal AS2 outputted from the pixel array 100 may have variations in a reset component for each pixel due to respective characteristics of each pixel, which may be referred to as fixed pattern noise (FPN), and respective characteristics of each logic circuit for outputting the analog signal AS from a corresponding pixel. Accordingly, an effective intensity of incident light is abstracted by subtracting the respective reset component from the detected intensity of incident light.

For this reason, each pixel included in the pixel array 100 may generate the first analog signal AS1 corresponding to a respective reset component, and detect the intensity of incident light to generate the second analog signal AS2 corresponding to a respective detected intensity of incident light based on the row selection signal SEL, the reset control signal RX and the transmission control signal TX. And then, the analog-to-digital conversion unit 300 may generate the pixel data PD corresponding to an effective intensity of incident light among the detected incident light by performing a correlated double sampling (CDS) operation on the first analog signal AS1 and the second analog signal AS2.

Referring again to FIG. 16, the timing controller 410 may control the operation of the reference signal generation unit 200 by providing a count enable signal CNT_EN to the reference signal generation unit 200.

The reference signal generation unit 200 may generate the reference signal Vref that decreases in the constant rate during an active period, in which the count enable signal CNT_EN is enabled.

Figure 18:
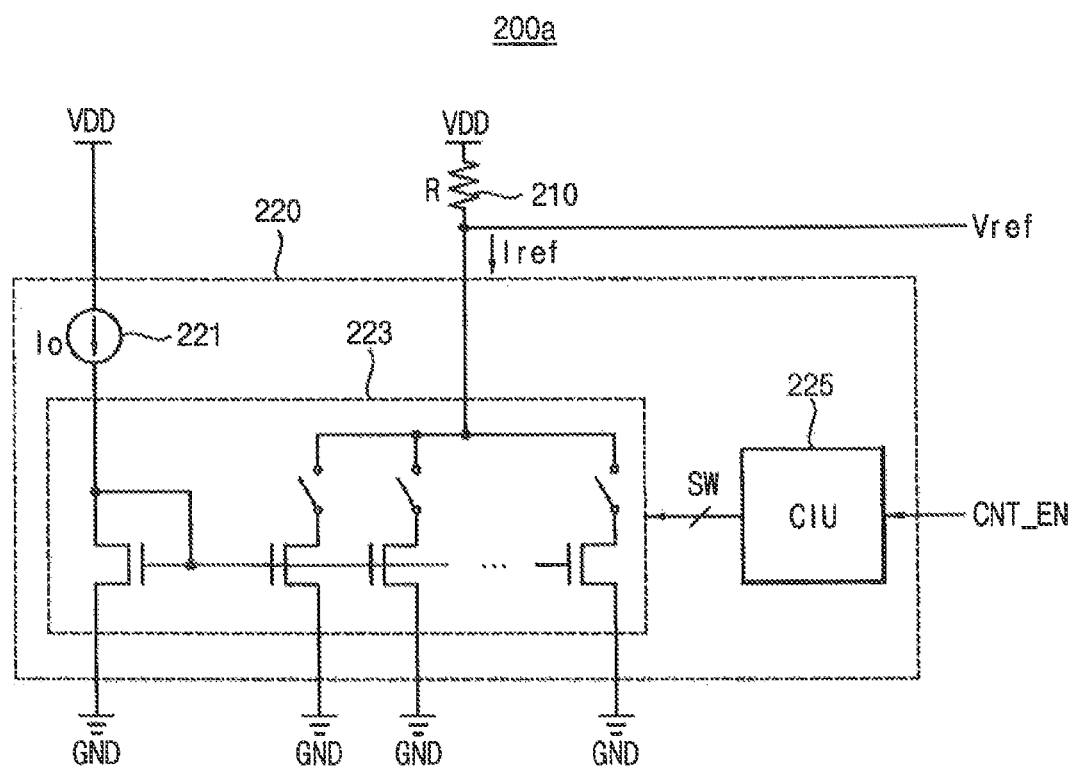
FIG. 18 is a block diagram illustrating an exemplary embodiment of a reference signal generation unit of FIG. 16.

FIG. 18 is a block diagram illustrating an exemplary embodiment of a reference signal generation unit of FIG. 16.

Referring to FIG. 18, a reference signal generation unit 200a may include a resistor R 210 and a current generation unit 220.

The resistor 210 may be coupled between a supply voltage VDD and the current generation unit 220.

The current generation unit 220 may be coupled between the resistor 210 and a ground voltage GND. The current generation unit 220 may generate a reference current Iref that increases in a constant rate during the active period, in which the count enable signal CNT_EN is enabled. The reference current Iref may flow from the resistor 210 to the ground voltage GND.

The current generation unit 220 may include a static current source 221, a current amplification unit 223 and a current control unit CIU 225.

The static current source 221 may generate a static current Io having a constant magnitude.

The current control unit 225 may generate an amplification control signal SW in response to the count enable signal CNT_EN.

The current amplification unit 223 may amplify the static current Io to generate the reference current Iref in response to the amplification control signal SW received from the current control unit 225. As illustrated in FIG. 18, the current amplification unit 223 may include a plurality of current mirrors each of which has an n-type metal oxide semiconductor (NMOS) transistor and a switch connected in series. Each switch included in each of the current mirrors may be controlled by the amplification control signal SW so that a magnitude of the reference current Iref may be adjusted.

The reference signal generation unit 200a may output the reference signal Vref from a node at which the resistor 210 and the current amplification unit 223 are coupled.

The reference signal Vref having a maximum value may be generated when all switches included in the current mirrors are opened. The reference signal Vref may be decreased in a constant rate by closing the switches consecutively one by one during the active period, in which the count enable signal CNT_EN is enabled.

The reference signal generation unit 200a of FIG. 18 is an example of the reference signal generation unit 200 included in the image sensor 10a of FIG. 16. However, exemplary embodiments of the present inventive concept are not limited thereto, and the reference signal generation unit 200 may be implemented in various structures.

Referring again to FIG. 16, the timing controller 410 may control the operation of the analog-to-digital conversion unit 300 by providing a count clock signal CLKC, an up-down control signal UD and a mode signal MD to the analog-to-digital conversion unit 300.

The analog-to-digital conversion unit 300 may determine an operation mode in response to the mode signal MD. For example, the analog-to-digital conversion unit 300 may operate in the first operation mode when the mode signal MD is at a first level, and the analog-to-digital conversion unit 300 may operate in the second operation mode when the mode signal MD is at a second level.

The analog-to-digital conversion unit 300 may generate the pixel data PD corresponding to an effective intensity of incident light among the detected incident light based on the first analog signal AS1 and the second analog signal AS2 received from the pixel array 100 in the first operation mode, and generate the binning pixel data BPD by performing a binning operation on the pixel data PD in the second operation mode.

The column driver 430 may consecutively output the pixel data PD or the binning pixel data BPD received from the analog-to-digital conversion unit 300 in response to a second inner control signal ICON2 received from the timing controller 410. Although not illustrated in FIG. 16, the pixel data PD or the binning pixel data BPD outputted from the column driver 430 may be provided to a digital signal processor.

In an exemplary embodiment of the present inventive concept, in the second operation mode, the analog-to-digital conversion unit 300 may select two rows for each of the blue pixels B, the green pixels G and the red pixels R in each of the binning areas BA, select a first pixel and a second pixel having a same color from one of the selected two rows, select a third pixel having the same color as the first pixel and the second pixel from the other one of the selected two rows, and perform the binning operation using the first through third pixels under a control of the control unit 400.

In an exemplary embodiment of the inventive concept, in the second operation mode, the analog-to-digital conversion unit 300 may select two rows for each of the blue pixels B, the green pixels G and the red pixels R in each of the binning areas BA, determine a first pixel and a second pixel having a same color from one of the selected two rows, determine a third pixel having the same color as the first pixel and the second pixel from the other one of the selected two rows, select all of the pixels that have the same color as the first through third pixels and are included in a selection area formed by connecting the first through third pixels with each other, and perform the binning operation using the selected pixels under a control of the control unit 400.

As described above with reference to FIGS. 3, 4 and 5, the first pixel may be located at a vertex of the binning area BA, the second pixel may correspond to a pixel that has a same color as the first pixel and is farthest from the first pixel in a row direction in the binning area BA, and the third pixel may correspond to a pixel that has a same color as the first pixel and is farthest from the first pixel in a column direction in the binning area BA.

Figure 19:
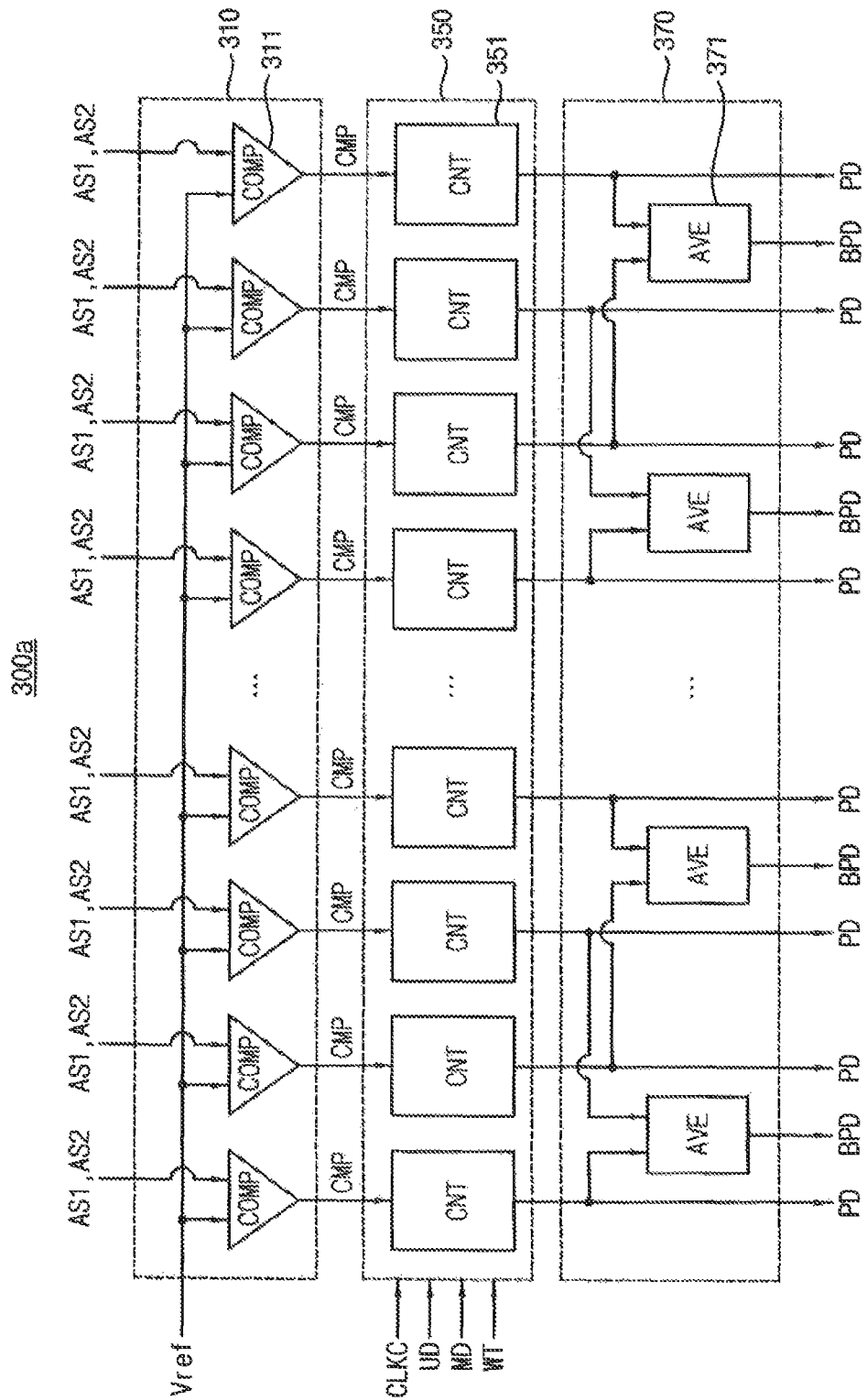
FIG. 19 is a block diagram illustrating an exemplary embodiment of an analog-to-digital conversion unit of FIG. 16.

FIG. 19 is a block diagram illustrating an exemplary embodiment of an analog-to-digital conversion unit of FIG. 16.

For ease of explanation, an analog-to-digital conversion unit 300a that operates when n is two such that each of the binning areas BA includes 4*4 pixels is illustrated in FIG. 19. However, exemplary embodiments of the present inventive concept are not limited thereto.

Referring to FIG. 19, the analog-to-digital conversion unit 300a may include a comparison unit 310, a count unit 350 and an average unit 370.

The comparison unit 310 may include a plurality of comparators COMP 311 each of which is connected to each column of the pixel array 100.

Each of the comparators 311 may generate a comparison signal CMP by comparing the first analog signal AS1 with the reference signal Vref and comparing the second analog signal AS2 with the reference signal Vref. For example, when each of the comparators 311 receives the first analog signal AS1 from the pixel array 100, each of the comparators 311 may compare the first analog signal AS with the reference signal Vref, enable the comparison signal CMP if the first analog signal AS1 is smaller than the reference signal Vref and disable the comparison signal CMP if the first analog signal AS1 is larger than the reference signal Vref. Alternatively, when each of the comparators 311 receives the second analog signal AS2 from the pixel array 100, each of the comparators 311 may compare the second analog signal AS2 with the reference signal Vref, enable the comparison signal CMP if the second analog signal AS2 is smaller than the reference signal Vref and disable the comparison signal CMP if the second analog signal AS2 is larger than the reference signal Vref. The comparison signal CMP may be enabled at a logic high level and disabled at a logic low level.

The count unit 350 may include a plurality of counters 351 each of which is connected to each of the comparators 311 and receives the comparison signal CMP from a respective comparator 311. Each of the counters 351 may receive the count clock signal CLKC, the up-down control signal UD and the mode signal MD from the timing controller 410 included in the control unit 400.

Each of the counters 351 may generate a counting value by performing one of a down-counting and an up-counting in response to the up-down control signal UD in synchronization with the count clock signal CLKC while the comparison signal CMP is enabled. The count clock signal CLKC may be toggled only during the active period in which the count enable signal CNT_EN is enabled.

The timing controller 410 may control each of the counters 351 to perform a down-counting by providing the up-down control signal UD having the first logic level to each of the counters 351 when the pixel array 100 generates the first analog signal AS1, and control each of the counters 351 to perform an up-counting by providing the up-down control signal UD having the second logic level to each of the counters 351 when the pixel array 100 generates the second analog signal AS2. The first logic level may be a logic high level and the second logic level may be a logic low level.

The count unit 350 may operate in the first operation mode when the mode signal MD is at a first level.

In the first operation mode, the control unit 400 may select rows of the pixel array 100 from an uppermost row of the pixel array 100 to a bottommost row of the pixel array 100. In the first operation mode, each of the counters 351 may generate a first counting value by performing the down-counting from zero in synchronization with the count clock signal CLKC while the comparison signal CMP is enabled when the pixel array 100 generates the first analog signal AS1, and generate a second counting value by performing the up-counting from the first counting value in synchronization with the count clock signal CLKC while the comparison signal CMP is enabled when the pixel array 100 generates the second analog signal AS2. Each of the counters 351 may output the second counting value as the pixel data PD.

The count unit 350 may operate in the second operation mode when the mode signal MD is at a second level.

In the second operation mode, the control unit 400 may consecutively select rows of the pixel array 100 that have the selected pixels. In other words, the control unit 400 may consecutively select rows having pixels on which a binning operation is performed.

In the second operation mode, while the control unit 400 consecutively selects rows having the selected pixels, each of the counters 351 may accumulate the second counting value corresponding to each of the selected pixels and output the accumulated second counting value as the pixel data PD.

For example, while the control unit 400 consecutively selects rows having the selected pixels, the counter 351 may perform the same operation as in the case of the first operation mode to generate the second counting value and accumulate the second counting value if one of the selected pixels is connected to a column corresponding to the counter 351, and stop performing the count operation and maintain the accumulated second counting value if a non-selected pixel is connected to a column corresponding to the counter 351. In this manner, each of the counters 351 may accumulate the second counting value corresponding to each of the selected pixels. After all the rows having the selected pixels are selected, each of the counters 351 may output the accumulated second counting value as the pixel data PD.

For example, as illustrated in FIG. 3, when the first through third blue pixels B1, B2 and B3, the first through third red pixels R4, R3 and R2, the first set of the first through third green pixels G2, G1 and G6, and the second set of the first through third green pixels G7, G8 and G3 are selected, the control unit 400 may consecutively select the first row ROW1 and the third row ROW3, and then consecutively select the fourth row ROW4 and the second row ROW2 in the second operation mode.

Referring to FIGS. 3 and 19, when the control unit 400 selects the first row ROW1, the selected pixels B1, G1, B2 and G2 may be connected to first through fourth columns. Therefore, each of the counters 351 corresponding to the first through fourth columns may generate a first counting value by performing the down-counting from zero in synchronization with the count clock signal CLKC while the comparison signal CMP is enabled when the respective selected pixel generates the first analog signal AS1, and generate a second counting value by performing the up-counting from the first counting value in synchronization with the count clock signal CLKC while the comparison signal CMP is enabled when the respective selected pixel generates the second analog signal AS2.

After that, when the control unit 400 selects the third row ROW3, the selected pixels B3 and G6 may be connected to first and fourth columns, respectively, and non-selected pixels G5 and B4 may be connected to second and third columns, respectively.

Therefore, each of the counters 351 corresponding to the first and fourth columns may generate a third counting value by performing the down-counting from the second counting value, which was generated when the first row ROW1 was selected, in synchronization with the count clock signal CLKC while the comparison signal CMP is enabled when the respective selected pixel generates the first analog signal AS1, and generate a fourth counting value by performing the up-counting from the third counting value in synchronization with the count clock signal CLKC while the comparison signal CMP is enabled when the respective selected pixel generates the second analog signal AS2.

On the other hand, each of the counters 351 corresponding to the second and third columns may maintain the second counting value, which was generated when the first row ROW1 was selected.

Since the first through third blue pixels B1, B2 and B3, and the first set of the first through third green pixels G2, G1 and G6 are included in the first row ROW1 and the third row ROW3, each of the counters 351 corresponding to the first and fourth columns may output the fourth counting value as the pixel data PD and each of the counters 351 corresponding to the second and third columns may output the second counting value as the pixel data PD after the control unit 400 selects the first row ROW1 and the third row ROW3.

The average unit 370 may include a plurality of average circuits AVE 371. Each of the average circuits 371 may be turned off in the first operation mode and generate the binning pixel data BPD by averaging the pixel data PD outputted from the counters 351 corresponding to columns of the pixel array 100 that have the selected pixels in the second operation mode.

For example, an average circuit 371 connected to the counters 351 corresponding to the first and third columns may generate the blue binning pixel data B_B and the second green binning pixel data G2_B alternately, and an average circuit 371 connected to the counters 351 corresponding to the second and fourth columns may generate the first green binning pixel data G1_B and the red binning pixel data R_B alternately.

For example, with reference to FIG. 3, in the event pixels B1 and B3 of the same column are selected and pixel B2 of the same row as pixel B1 (but of a different column) is selected, B1 and B2 are averaged, the average of these two pixels is added to a value of the pixel B3, and then, this sum is averaged to produce binning pixel data for the selected pixels B1, B2 and B3.

In an exemplary embodiment of the present inventive concept, in the second operation mode, the control unit 400 may provide weight values WT to the counters 351, and each of the counters 351 may apply the weight values WT different from each other to the second counting values corresponding to the selected pixels, accumulate the weighted second counting values and output the accumulated value as the pixel data PD.

In this case, the control unit 400 may adjust the locations at which the binning pixel data BPD are generated using the weight values WT such that the binning pixel data BPD may be evenly distributed in the pixel array 100.

Figure 20:
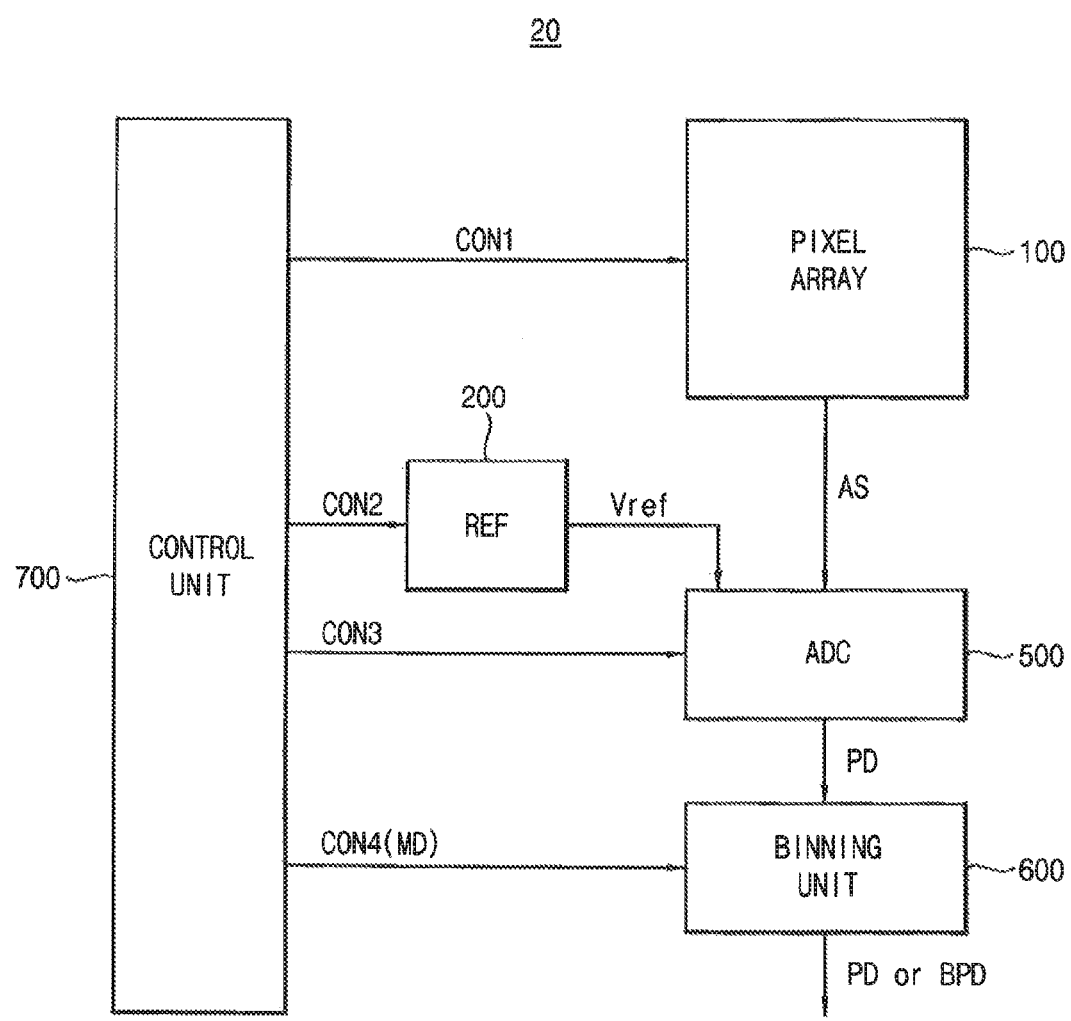
FIG. 20 is a block diagram illustrating an image sensor according to an exemplary embodiment of the present inventive concept.

FIG. 20 is a block diagram illustrating an image sensor according to an exemplary embodiment of the present inventive concept.

The method of binning pixels of FIG. 1 may be performed by an image sensor 20 of FIG. 20.

Hereinafter, an operation of the image sensor 20 will be described with reference to FIGS. 1 to 14 and 20.

Referring to FIG. 20, the image sensor 20 includes a pixel array 100, a reference signal generation unit REF 200, an analog-to-digital conversion unit ADC 500, a binning unit 600 and a control unit 700.

The pixel array 100 includes a plurality of pixels arranged in rows and columns. As illustrated in FIG. 2, the pixel array 100 has a Bayer pattern. For example, the pixel array 100 may include an odd row in which blue pixels B and green pixels G are alternately arranged and an even row in which green pixels G and red pixels R are alternately arranged.

Each of the pixels included in the pixel array 100 detects incident light and generates an analog signal AS in response to the detected incident light.

The analog-to-digital conversion unit 500 generates pixel data PD by performing an analog-to-digital conversion on the analog signal AS provided from each of the pixels.

In an exemplary embodiment of the inventive concept, the reference signal generation unit 200 may generate a reference signal Vref that changes in a constant rate, and the analog-to-digital conversion unit 500 may perform an analog-to-digital conversion using the reference signal Vref.

The binning unit 600 outputs the pixel data PD by bypassing the pixel data PD in a first operation mode, and generates binning pixel data BPD by performing a binning operation on the pixel data PD.

In the second operation mode, the binning unit 600 performs the method of binning pixels of FIG. 1. In other words, the binning unit 600 divides the pixel array 100 into a plurality of binning areas BA having a square shape such that each of the binning areas BA includes (2n)*(2n) pixels (step S100). Here, n represents an integer equal to or greater than two. The binning unit 600 selects a different number of pixels having a same color from each of at least two rows in each of the binning areas BA (step S200). Therefore, in each of the binning areas BA, the number of the pixels selected from each of the at least two rows may be different from each other. The binning unit 600 generates the binning pixel data BPD by performing a binning operation on the pixel data PD corresponding to the selected pixels (step S300).

The first operation mode may be a still image capturing mode and the second operation mode may be a video recording mode.

The control unit 700 controls an operation of the pixel array 100 using a first control signal CON1, controls an operation of the reference signal generation unit 200 using a second control signal CON2, controls an operation of the analog-to-digital conversion unit 500 using a third control signal CON3, and controls an operation of the binning unit 600 using a fourth control signal CON4. The control unit 700 may determine an operation mode of the binning unit 600 using a mode signal MD included in the fourth control signal CON4.

The method of binning pixels of FIG. 1 is described above with reference to FIGS. 1 to 14. Therefore, a detailed description of the binning unit 600 of FIG. 20 will be omitted.

Figure 21:
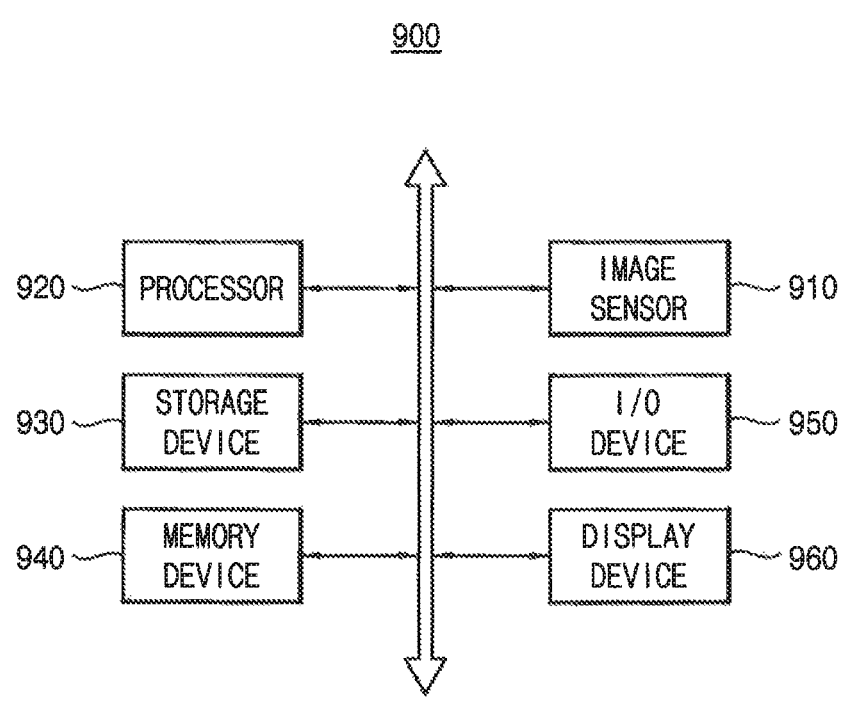
FIG. 21 is a block diagram illustrating a computing system including an image sensor according to an exemplary embodiment of the present inventive concept.

FIG. 21 is a block diagram illustrating a computing system including an image sensor according to an exemplary embodiment of the present inventive concept.

Referring to FIG. 21, a computing system 900 includes an image sensor 910, a processor 920, a storage device 930, a memory device 940, an input/output device 950 and a display device 960. Although it is not illustrated in FIG. 21, the computing system 900 may further include ports that communicate with a video card, a sound card, a memory card, a universal serial bus (USB) device, or other electronic devices.

The image sensor 910 generates image data in response to incident light. The display device 960 displays the image data. The storage device 930 stores the image data. The processor 920 controls operations of the image sensor 910, the display device 960 and the storage device 930.

The processor 920 may perform various calculations or tasks. According to an exemplary embodiment of the present inventive concept, the processor 920 may be a microprocessor or a central processing unit (CPU). The processor 920 may communicate with the storage device 930, the memory device 940 and the input/output device 950 via an address bus, a control bus, and/or a data bus. In an exemplary embodiment of the present inventive concept, the processor 920 may be coupled to an extended bus, such as a peripheral component interconnection (PCI) bus.

The storage device 930 may include a non-volatile memory device such as a flash memory device, a solid state drive (SSD), a hard disk drive (HDD), a compact disk read-only memory (CD-ROM) drive, etc.

The memory device 940 may store data required for an operation of the computing system 900. The memory device 940 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 950 may include a touch screen, a keypad, a keyboard, a mouse, a printer, etc.

The image sensor 910 may be connected to the processor 920 through one or more of the above buses or other communication links to communicate with the processor 920.

The image sensor 910 may generate binning pixel data, which are generated at distributed locations in a pixel array, by performing a binning operation on pixel data generated from pixels of the pixel array.

The image sensor 910 may be embodied with the image sensor 10 of FIG. 15 or the image sensor 20 of FIG. 20. A structure and an operation of the image sensor 10 of FIG. 15 and the image sensor 20 of FIG. 20 are described above with reference to FIGS. 1 to 20. Therefore, a detailed description of the image sensor 910 will be omitted.

The image sensor 910 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi chip package (MCP), wafer-level fabricated package (WFP), or wafer-level processed stack package (WSP).

According to an exemplary embodiment of the present inventive concept, the image sensor 910 may be integrated with the processor 920 in one chip, or the image sensor 910 and the processor 920 may be implemented as separate chips.

The computing system 900 may be any computing system using an image sensor. For example, the computing system 900 may include a digital camera, a mobile phone, a smart phone, a portable multimedia player (PMP), a personal digital assistant (PDA), etc.

Figure 22:
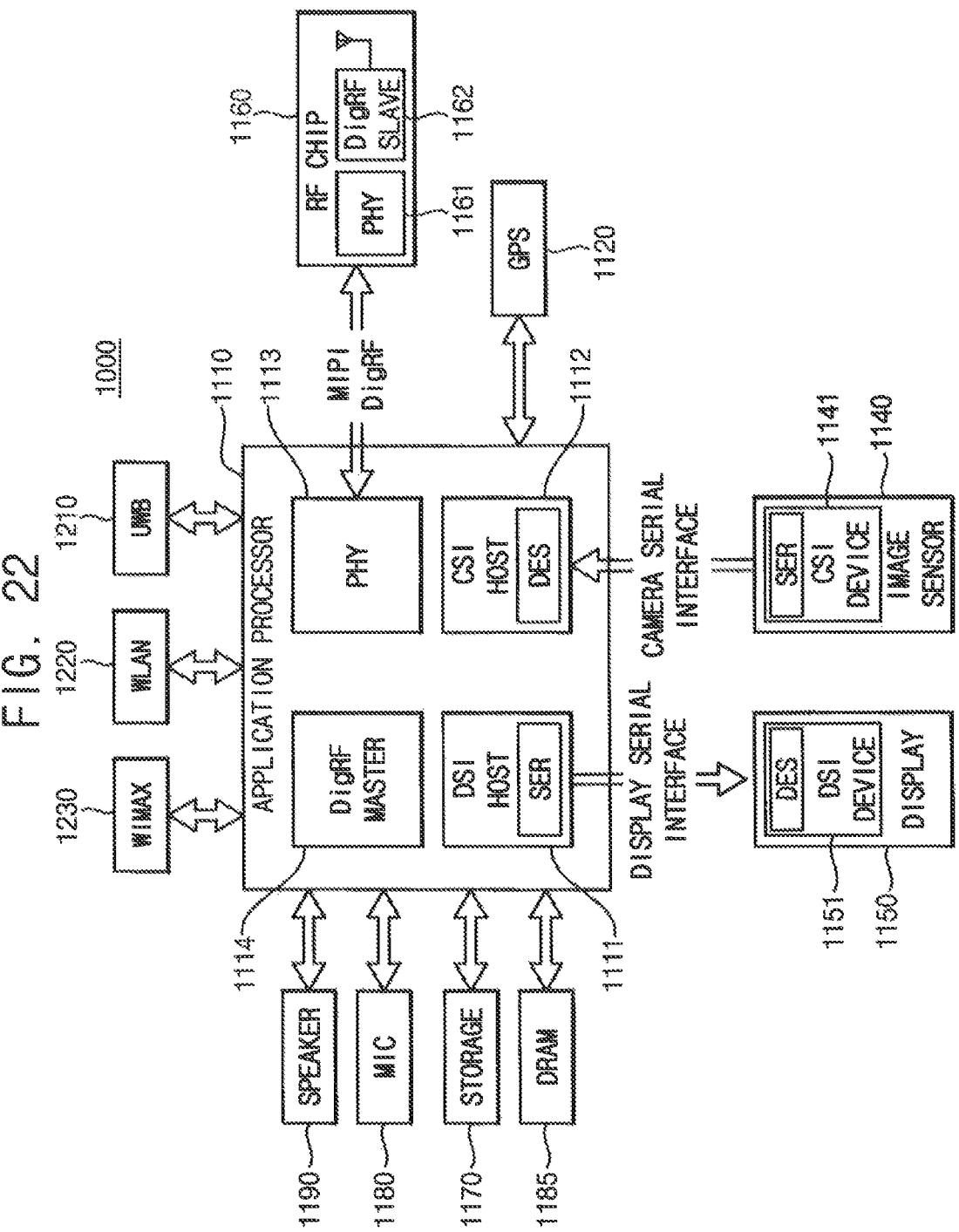
FIG. 22 is a block diagram illustrating an exemplary embodiment of an interface used in the computing system of FIG. 21.

FIG. 22 is a block diagram illustrating an exemplary embodiment of an interface used in the computing system of FIG. 21.

Referring to FIG. 22, a computing system 1000 may be implemented by a data processing device (e.g., a cellular phone, a PDA, a PMP, a smart phone, etc.) that uses or supports a mobile industry processor interface (MIPI) interface. The computing system 1000 may include an application processor 1110, an image sensor 1140, a display device 1150, etc.

A CSI host 1112 of the application processor 1110 may perform a serial communication with a CSI device 1141 of the image sensor 1140 via a camera serial interface (CSI). In an exemplary embodiment of the present inventive concept, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In an exemplary embodiment of the present inventive concept, the DSI host 1111 may include a SER, and the DSI device 1151 may include a DES.

The computing system 1000 may further include a radio frequency (RF) chip 1160 for performing a communication with the application processor 1110. A physical layer (PHY) 1113 of the computing system 1000 and a PHY 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The computing system 1000 may further include a global positioning system (GPS) 1120, a storage 1170, a microphone MIC 1180, a DRAM device 1185, and a speaker 1190. In addition, the computing system 1000 may perform communications using an ultra wideband (UWB) 1210, a wireless local area network (WLAN) 1220, a worldwide interoperability for microwave access (WIMAX) 1230, etc. However, the structure and the interface of the computing system 1000 are not limited thereto.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method of binning pixels in an image sensor, comprising:
   dividing a pixel array into a plurality of binning areas, wherein each binning area includes (2n)*(2n) pixels, wherein n is an integer equal to or greater than three;
   for pixels having the same color in each of the binning areas, selecting a number of those pixels in a row and selecting a different number of those pixels in another row; and
   generating binning pixel data from the selected pixels, wherein in a first binning area of the binning areas the selected pixels having the same color include a first color, a first pixel disposed at a vertex of the first binning area in a first row and in a first column, a second pixel disposed apart from the first pixel in the first row, and a third pixel disposed apart from the first pixel in the first column,
   wherein the second pixel is the farthest same color pixel from the first pixel in the first row,
   wherein the third pixel is the farthest same color pixel from the first pixel in the first column.

2. The method of claim 1, wherein the first color includes blue, red or green.

3. The method of claim 1, wherein the first, second and third pixels form a right-angle triangle.

4. The method of claim 1, wherein the selected pixels having the same first color in the first binning area include at least one pixel disposed between the first and second pixels in the first row, at least one pixel disposed between the first and third pixels in the first column or at least one pixel disposed along a straight line formed between the second and third pixels.

5. The method of claim 1, wherein generating the binning pixel data comprises performing an arithmetic average operation on the selected pixels having the same first color in the first binning area to generate first binning pixel data.

6. The method of claim 1, wherein generating the binning pixel data comprises performing a weighted average operation on the selected pixels having the same first color in the first binning area to generate first binning pixel data.

7. The method of claim 1, wherein the pixel array has a Bayer pattern.

8. The method of claim 1, wherein the binning pixel data is generated in a video recording mode.

9. A method of binning pixels in an image sensor, comprising:
   dividing a pixel array into a plurality of binning areas, wherein a first binning area includes (2n)*(2n) pixels, wherein n is an integer equal to or greater than two;
   for first color pixels in the first binning area, selecting two of the first color pixels from a first row that are separated by the greatest distance from each other and selecting one first color pixel from a second row, wherein the selected one first color pixel from the second row is in the same column as one of the selected first color pixels from the first row;
   first averaging the selected two first color pixels from the first row at an average circuit connected to and receiving a signal from a first counter corresponding to a first color pixel from the first row and connected to and receiving a signal from a second counter corresponding to another first color pixel from the first row;
   adding the average of the selected two first color pixels from the first row to a value of the selected one first color pixel from the second row, wherein a signal corresponding to the selected one first color pixel from the second row is output from the first counter and bypasses the average circuit; and
   second averaging this sum to produce binning pixel data for the three selected first color pixels.

10. The method of claim 9, wherein the binning pixel data for the three selected first color pixels is produced in a sub-sampling mode.

11. The method of claim 10, wherein the sub-sampling mode is an image preview mode or a movie mode.

12. The method of claim 11, wherein the first averaging is performed in an analog to digital converter and the second averaging is performed in an image signal processor.

13. An image sensor, comprising:
   a pixel array including a plurality of pixels, wherein each of the pixels generates an analog signal in response to incident light;
   a controller configured to select pixels from a first row and a second row in a binning area of the pixel array, wherein the binning area includes (2n)*(2n) pixels, wherein n is an integer equal to or greater than two;
   an analog to digital converter configured to generate pixel data in response to the analog signals provided from each of the pixels and generate averaging pixel data in response to the analog signals provided from the selected pixels; and
   an image signal processor configured to receive an output of the analog to digital converter, wherein, in a sub-sampling mode, the analog to digital converter:
   performs a count operation on a first pixel and a second pixel, which have a same color and correspond to selected pixels of the first row, to generate a first count and a second count value, respectively, wherein the first and second count values are input to an average circuit of the analog to digital converter, averaged and output as binning pixel data,
   performs the count operation on a third pixel, which has the same color as the first pixel, corresponds to a selected pixel of the second row, and is arranged in a same column as the first pixel, in succession to the first count value to generate a third count value wherein third content value is not input to the average circuit, and
   stops performing the count operation on a fourth pixel, which corresponds to an unselected pixel of the second row, and is arranged in a same column as the second pixel.

14. The image sensor of claim 13, wherein the third count value corresponds to a sum of the first pixel and the third pixel.

15. The image sensor of claim 13, further comprising a camera serial interface.

* * * * *